US012322914B2

(12) United States Patent
Novak et al.

(10) Patent No.: US 12,322,914 B2
(45) Date of Patent: Jun. 3, 2025

(54) FIELD TERMINABLE SINGLE PAIR ETHERNET CONNECTOR WITH ANGLED CONTACTS

(71) Applicant: Panduit Corp., Tinley Park, IL (US)

(72) Inventors: Benjamin S. Novak, Lockport, IL (US); Satish I. Patel, Roselle, IL (US); Sean W. Lenz, Countryside, IL (US); Roman J. Churnovic, Manhatttan, IL (US); Robert E. Fransen, Orland Park, IL (US); Robert L. Fritz, Elwood, IL (US); Jason O'Young, Tinley Park, IL (US)

(73) Assignee: Panduit Corp., Tinley Park, IL (US)

( * ) Notice: Subject to any disclaimer, the term of this patent is extended or adjusted under 35 U.S.C. 154(b) by 296 days.

(21) Appl. No.: 17/899,702

(22) Filed: Aug. 31, 2022

(65) Prior Publication Data

US 2023/0066043 A1 Mar. 2, 2023

Related U.S. Application Data

(63) Continuation-in-part of application No. 16/950,177, filed on Nov. 17, 2020, now Pat. No. 11,811,181.

(60) Provisional application No. 62/937,308, filed on Nov. 19, 2019.

(51) Int. Cl.
*H01R 24/64* (2011.01)
*H01R 24/22* (2011.01)

(52) U.S. Cl.
CPC ............. *H01R 24/64* (2013.01); *H01R 24/22* (2013.01); *H01R 2201/04* (2013.01)

(58) Field of Classification Search
None
See application file for complete search history.

(56) References Cited

U.S. PATENT DOCUMENTS 4,917,629 A * 4/1990 Matsuzaki ........... H01R 4/2433 29/866
6,193,526 B1 2/2001 Milner et al.
6,371,793 B1 4/2002 Doorhy et al.
6,648,670 B1 11/2003 Chen
7,156,688 B2 * 1/2007 Nakano ................ H01R 4/2433 439/417
7,241,165 B2 * 7/2007 Scheer ................. H01R 12/675 439/492

(Continued)

FOREIGN PATENT DOCUMENTS

EP 2747206 A1 6/2014
EP 2747207 A1 6/2014

(Continued)

*Primary Examiner* — Tho D Ta
(74) *Attorney, Agent, or Firm* — Christopher S. Clancy; James H. Williams

(57) ABSTRACT

A communications connector has a shielded jack body and a wire cap. The shielded jack body has a single pair of plug interface contacts having a first thickness and a single pair of insulation displacement having a second smaller thickness. The plug interface contacts are configured to electrically connect to the insulation displacement contacts. The wire cap is configured to terminate a pair of conductors to the pair of insulation displacement contacts by being secured to the shielded jack body in a direction perpendicular to a direction of an insertion of an associated connector.

2 Claims, 38 Drawing Sheets

(56) References Cited

U.S. PATENT DOCUMENTS

| | | | | |
|---|---|---|---|---|
| 10,148,048 | B2 * | 12/2018 | Larsson ............. | H01R 13/6463 |
| 2018/0131146 | A1 | 5/2018 | Larsson et al. | |
| 2018/0323550 | A1 | 11/2018 | Brennan et al. | |
| 2019/0229438 | A1 * | 7/2019 | Naganuma ........... | H01R 13/506 |
| 2021/0151905 | A1 | 5/2021 | Novak et al. | |

FOREIGN PATENT DOCUMENTS

| | | | |
|---|---|---|---|
| EP | 3847720 | A1 | 7/2021 |
| EP | 3996208 | B1 | 5/2022 |
| JP | 2005216688 | A | 8/2005 |
| JP | 2006228735 | A | 8/2006 |
| JP | 201309792 | A | 5/2013 |
| JP | 2018014212 | A | 1/2018 |
| JP | 2018181769 | A | 11/2018 |
| WO | 2018200528 | A1 | 11/2018 |
| WO | 2019147774 | A1 | 8/2019 |

* cited by examiner

FIELD TERMINABLE SINGLE PAIR ETHERNET CONNECTOR WITH ANGLED CONTACTS

CROSS REFERENCE TO RELATED APPLICATIONS

This application is a continuation-in-part of U.S. patent application Ser. No. 16/950,177, filed on Nov. 17, 2020, and claims the benefit of U.S. Provisional Application Ser. No. 62/937,308, filed Nov. 19, 2019, which is incorporated by reference herein in its entirety.

FIELD OF THE INVENTION

The present invention is generally related to connectors and more specifically to single pair Ethernet plugs using an LC form factor.

BACKGROUND

Copper connectors are becoming increasingly compact in an effort to achieve a higher density of data channels in a given area, as well as for use in applications where data needs to be transmitted to remote devices, such as security cameras and climate control devices. These compact connectors are generally required to be installable onto cable in the field using simple hand operated tools. Typically, for an ethernet data connection, a four pair cable solution would be deployed using RJ45 jacks as the interconnection. However, the full bandwidth of a Cat 6a system is not necessary for low bandwidth applications such as, but not limited to, sensors, lights, and other smart building devices. In this case, a single twisted pair cabling solution can be deployed that will save material costs as well as reduce the amount of space used by the structured cabling system. With the recent advancements of ethernet bandwidths using copper media, the data throughput will be adequate for most smart devices. The field terminable design provides an advantage by allowing installers to build custom cabling structures and only use the necessary amount of cable for the end user's application. This customization eliminates the need for additional cabling management techniques which saves time and resources for field technicians deploying the structured cabling system. The present invention describes a single pair connector that provides these advantages, but contains several small complex parts that increase the cost of manufacture and are prone to broken or lost pieces.

What is needed is a termination design that can be adapted to a small form factor that is simple and inexpensive to manufacture as well as quickly and easily terminated by an installer without complex and expensive tools.

SUMMARY

A communications connector has a main plug assembly and a wire cap that is configured to terminate a pair of conductors to the pair of contacts by being secured to a side of the main plug assembly in a direction perpendicular to a plane defined by a deflection direction of a latch of the connector. In another embodiment, a communications connector has a main plug assembly and two electrical contacts within the main plug assembly wherein each electrical contact has a first end having a forked receptacle and a second end having an IDC that is configured to have a conductor terminated in a direction perpendicular to a direction of mating insertion and parallel to a plane defined by the contact. In some embodiments, the connector can also have a shield wrap and an outer cover wherein the shield wrap has a wraparound flange configured to wrap around a wall of the main plug body and a drain wire retention notch configured to allow a drain wire of an inserted cable to wrap around the wraparound flange and be secured between the shield wrap and outer cover.

DETAILED DESCRIPTION OF THE DRAWINGS

In one embodiment, the present invention is a single pair ethernet plug based on a fiber LC connector form factor due to its compact size, low cost, and ease of manufacturability. The plug features a snap together toolless termination method for quick installation and the ability to be re-terminated onto new cable.

Figure 1:
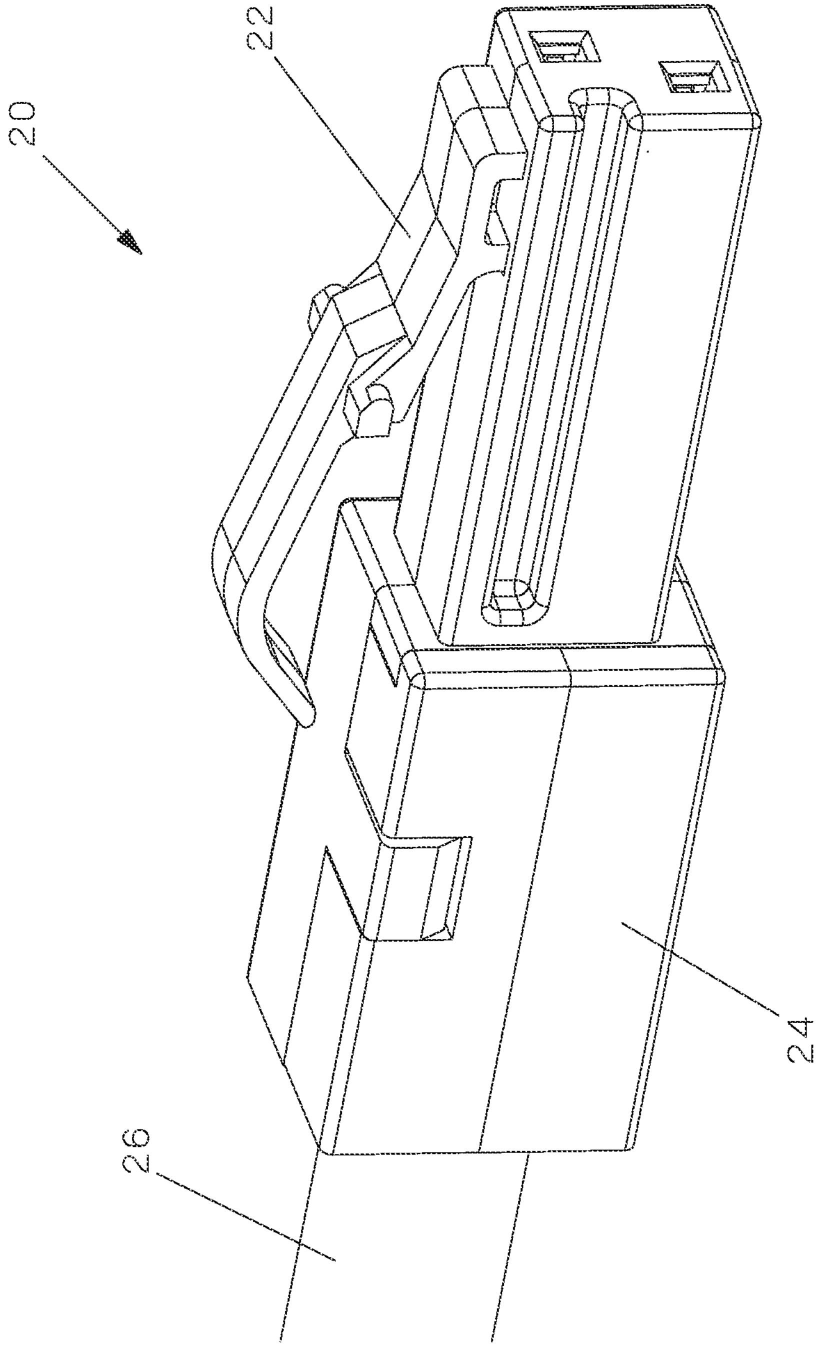
FIG. 1 is an isometric view of a first embodiment of a single pair ethernet plug.

FIG. 1 shows a first embodiment of a single pair ethernet plug assembly 20. The single pair ethernet plug assembly 20 has a main plug assembly 22, wire cap 24, and single pair ethernet cable 26.

Figure 2:
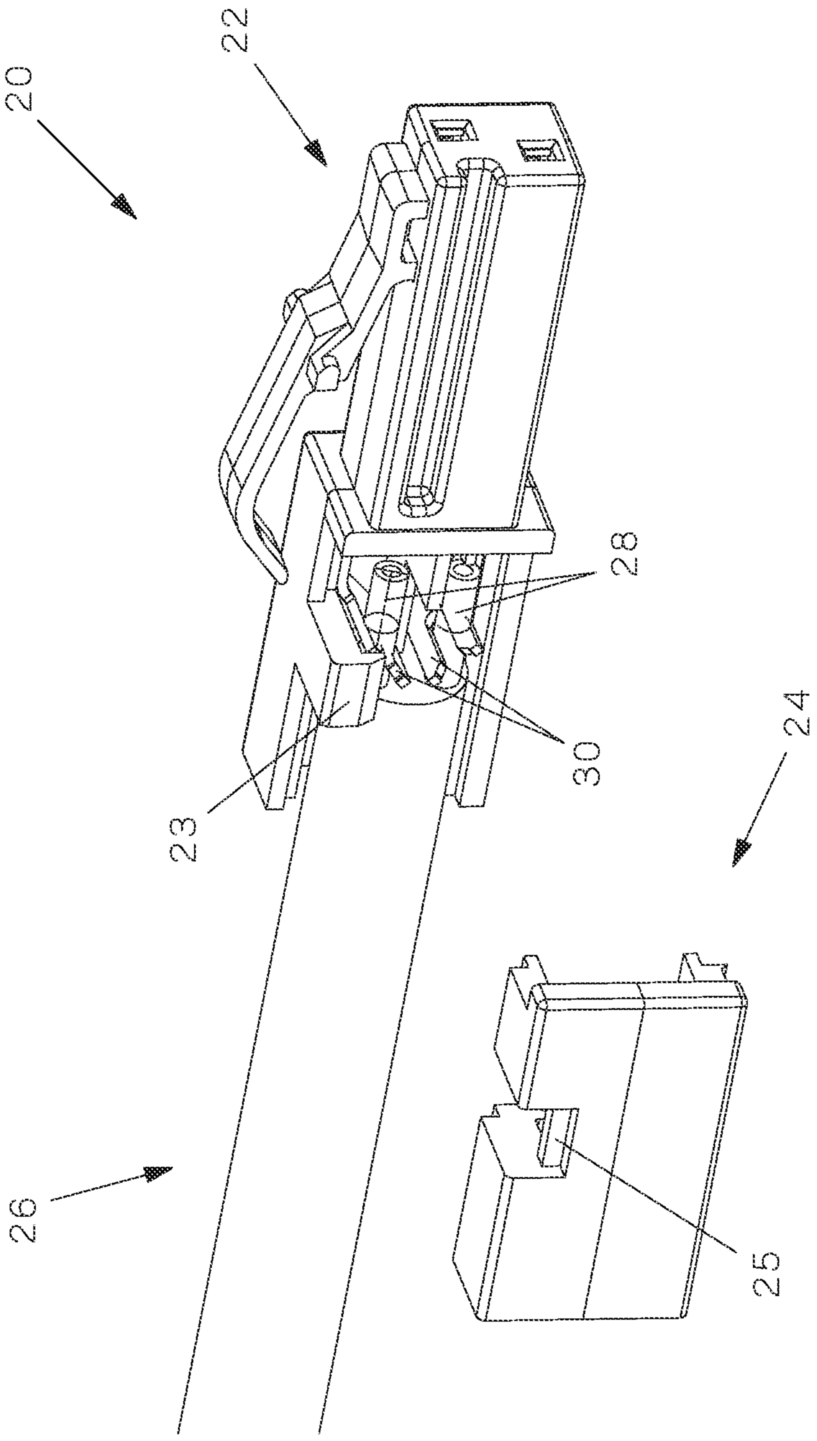
FIG. 2 is an isometric view of the plug of FIG. 1 with the wire cap removed.

FIG. 2 shows single pair ethernet plug assembly 20 with wire cap 24 uninstalled. Conductors 28 of cable 26 are shown pressed into contacts 30 of main plug assembly 22. Wire cap 24 is retained to main plug assembly 22 via plug body latches 23 and wire cap pockets 25. This design allows for the wire cap 24 to depress conductors 28 into contacts 30 without the need for any special tools, and in cases of low quantities, can be done by hand.

In one embodiment, the design of the wire cap 24 allows it to be secured to a side of the main plug assembly wherein the side is in a direction perpendicular to a plane defined by the direction of deflection of the latch of the plug.

Figure 3:
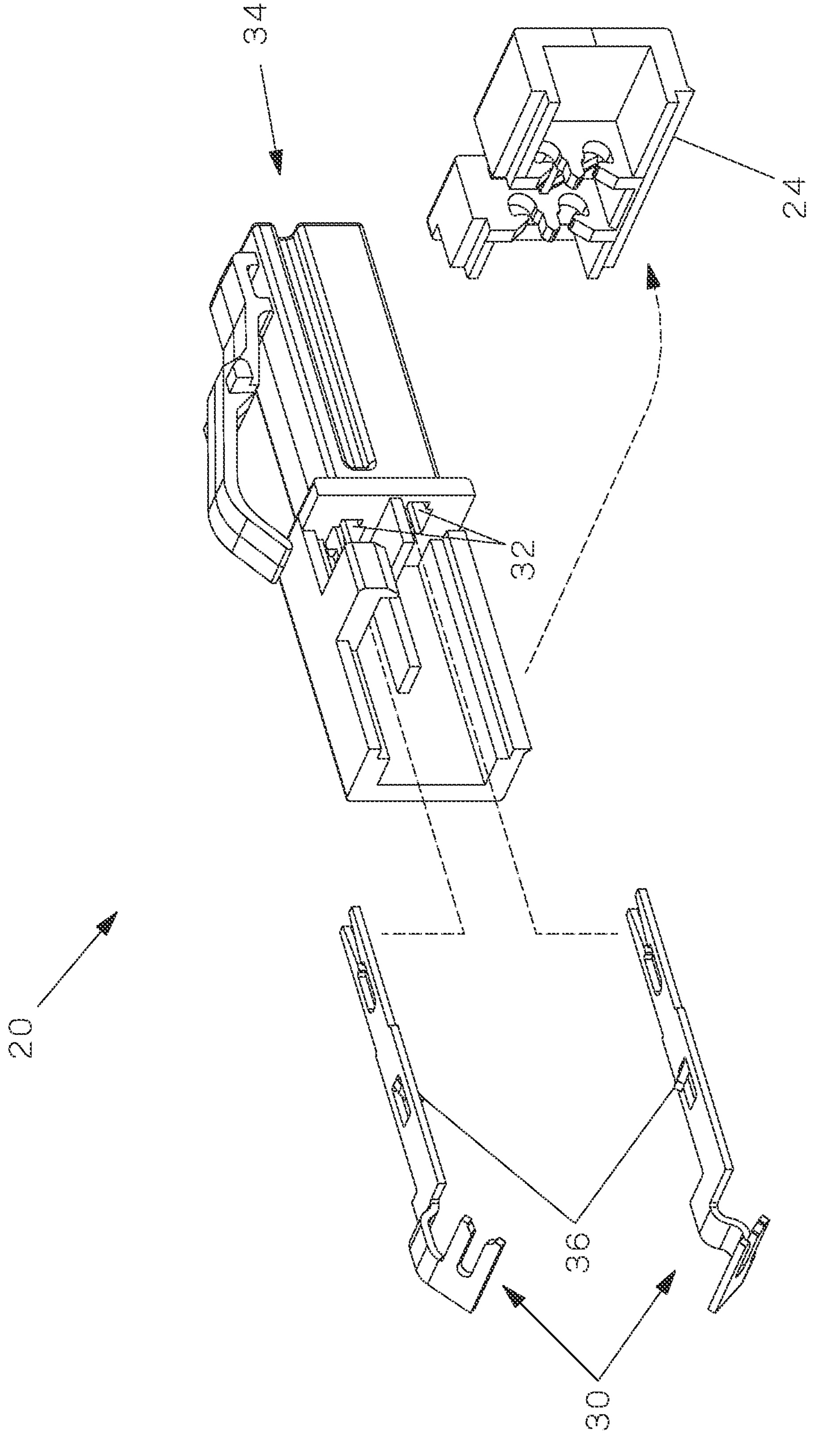
FIG. 3 is an exploded isometric view of the plug of FIG. 1.

FIG. 3 shows a fully exploded view of single pair ethernet plug assembly 20. Contacts 30 are inserted into slots 32 of main plug body 34. Barbs 36 of contacts 30 prevent the contacts from pulling out of main plug body 34 by biting into the walls of slots 32 if the contacts are pulled against the direction of insertion.

Figure 4:
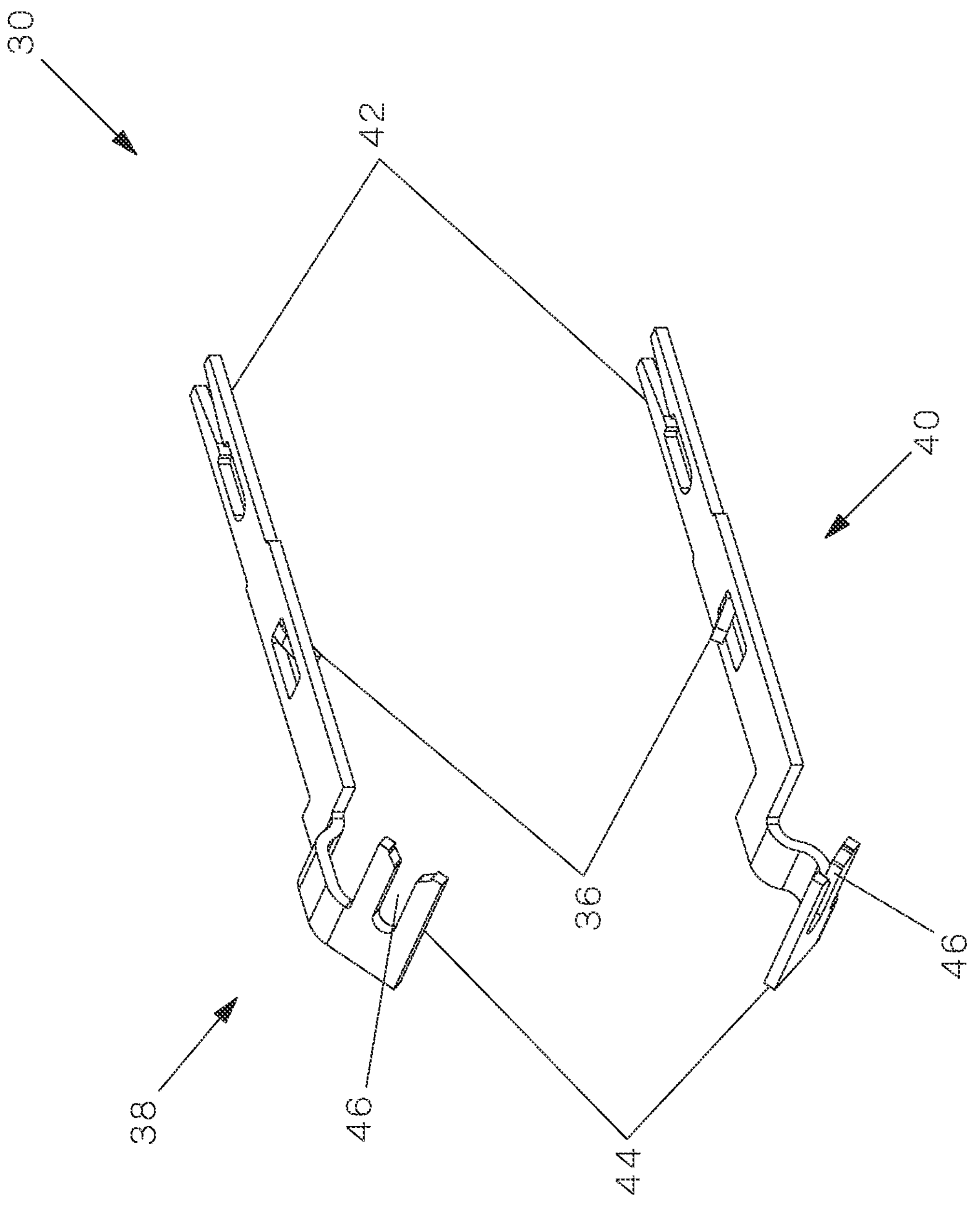
FIG. 4 is an isometric view of the contacts of the plug of FIG. 1.

FIG. 4 shows contacts 30, which include upper contact 38 and lower contact 40. Each contact features front interfaces 42 that engage with the contact pins of active equipment jacks. Insulation displacement contacts 44 pierce the conductor insulation of single pair ethernet cable 26 to establish electrical continuity. Insulation displacement contacts 44 are angled relative to the axes of the conductors 28 of single pair ethernet cable 26 to allow effective cutting of the insulation of conductors 28 without the need for a secondary coining operation to the conductor insertion area 46 to create a cutting edge. Contacts 30 also feature barbs 36 as previously explained in FIG. 3. The lengths of upper contact 38 and lower contact 40 may be equal for electrical balance.

Figure 5:
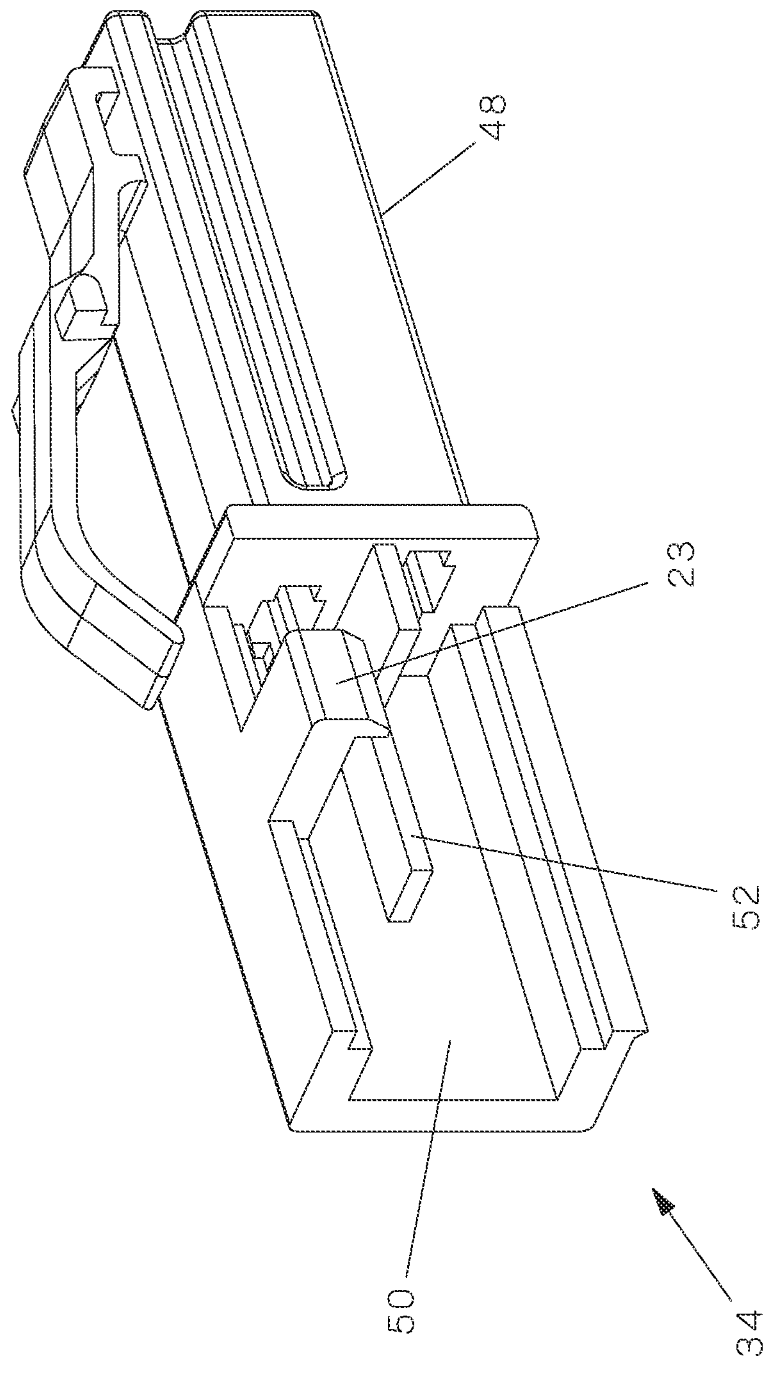
FIG. 5 is an isometric view of the main plug body of the plug of FIG. 1.

FIG. 5 shows main plug body 34 having front interface area 48 and rear termination area 50. Rear termination area 50 has divider wall 52 to separate contacts 30 to prevent shorting and reduce the potential for hi-pot failures between upper contact 38 and lower contact 40. Plug body latches 23 engage with wire cap 24 upon completion of termination. The latches may be disengaged to allow for cable untermination/retermination and plug reuse.

Figure 6:
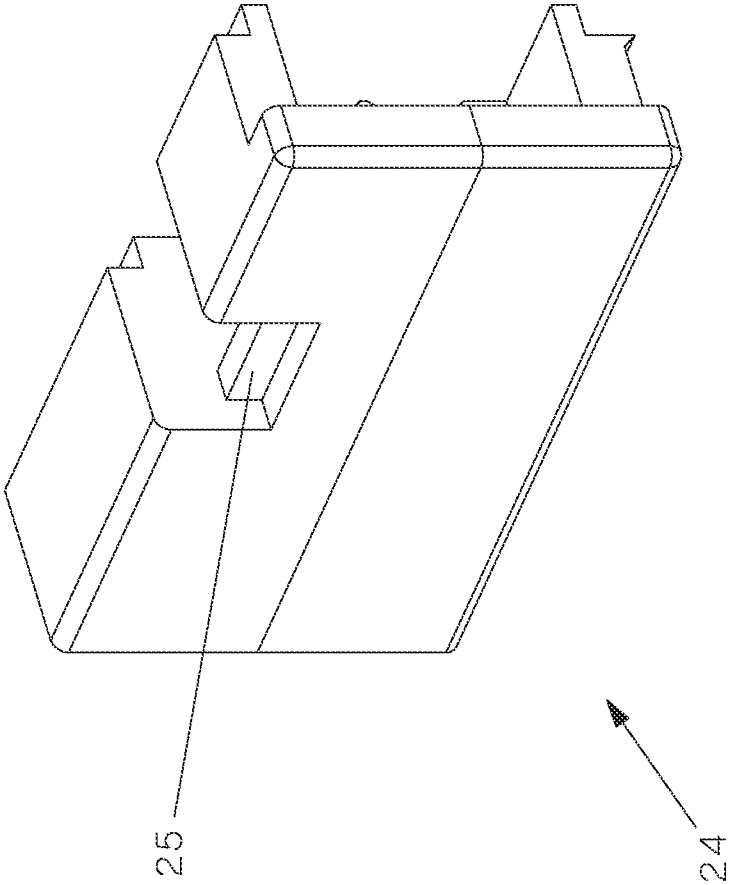
FIG. 6 is an isometric view of the wire cap of the plug of FIG. 1.
Figure 7:
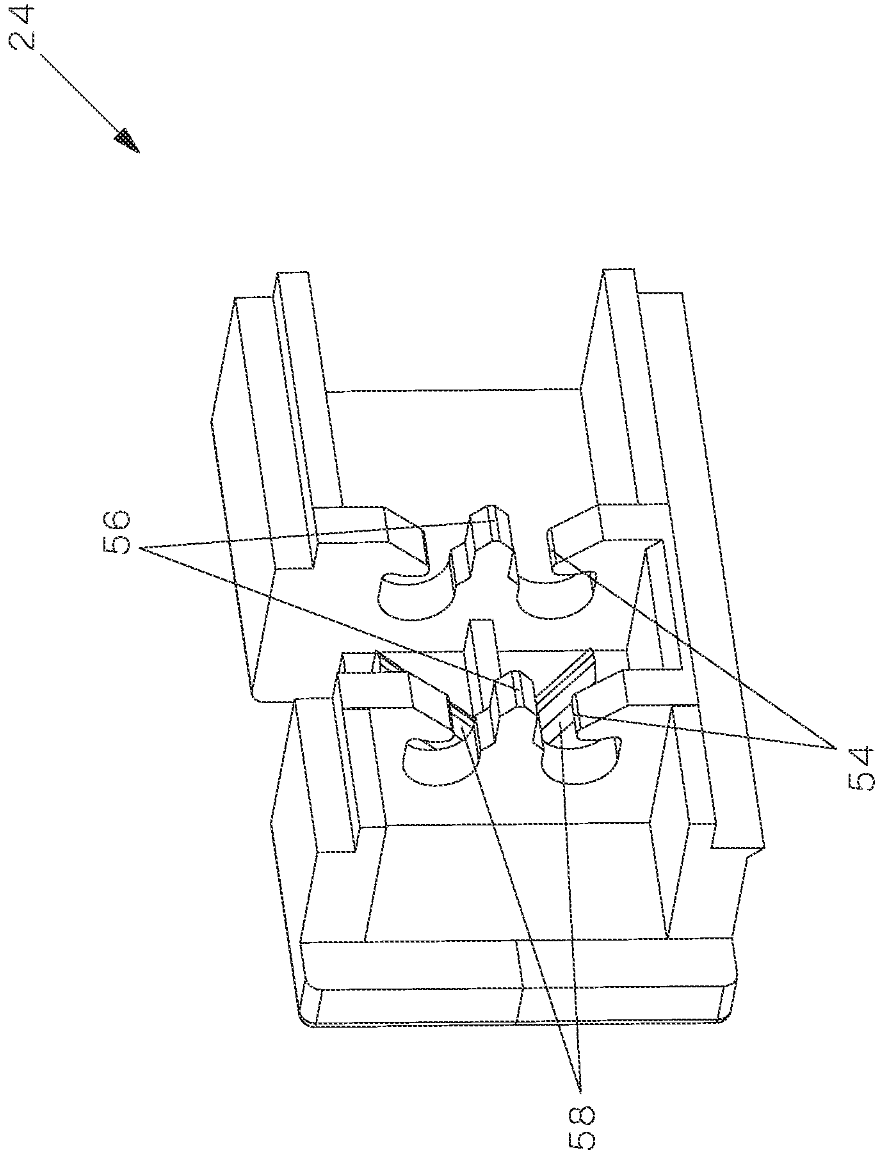
FIG. 7 is an isometric view of the wire cap of FIG. 6 rotated 180 degrees.
Figure 8:
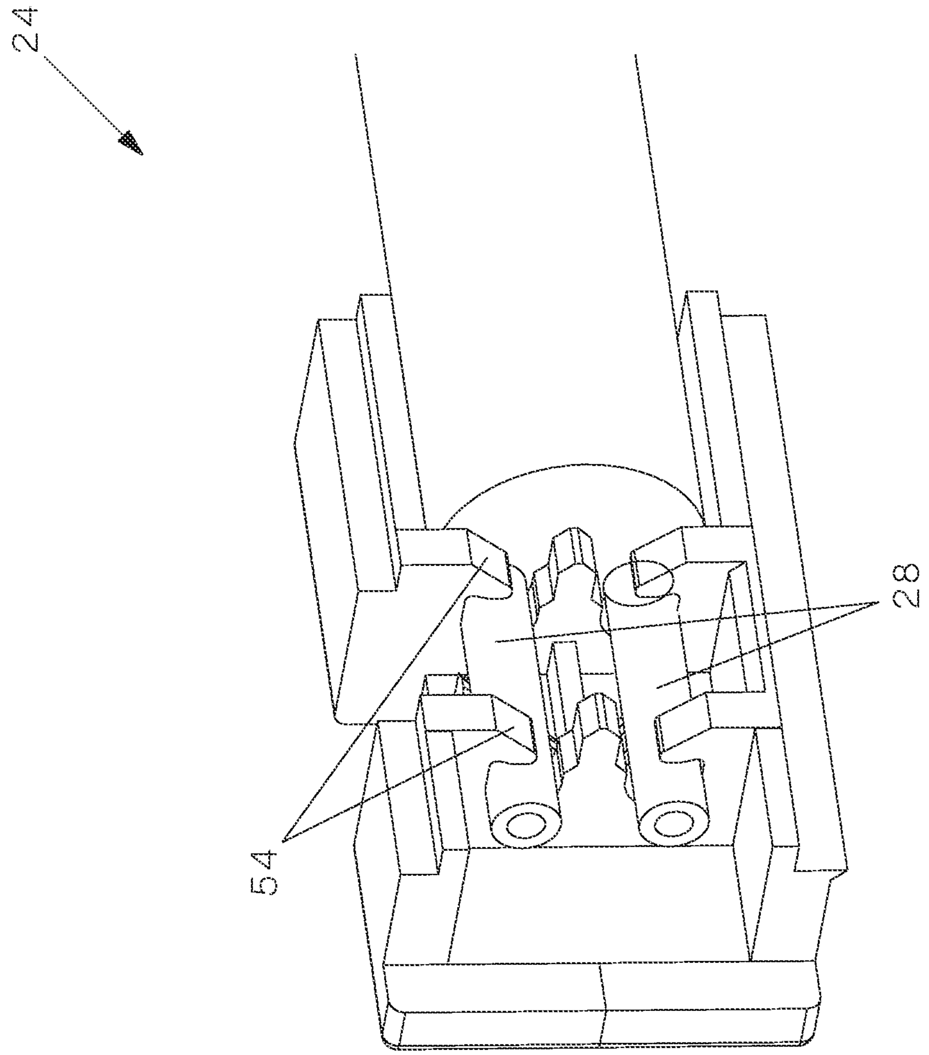
FIG. 8 is an isometric view of the wire cap of FIG. 7 with an inserted communication cable.

FIGS. 6-8 show detailed views of wire cap 24. Wire cap pockets 25 engage with plug body latches 23. Conductor retention hooks 54 hold conductors 28 in place prior to installation onto main plug assembly 22. Wire cap divider wall 56 prevents insulation displacement contacts 44 from touching each other and creating a short. Ribs 58 push the conductors 28 into the conductor insertion area 46 of insulation displacement contacts 44.

The single pair ethernet plug may be offered in a shielded version for use with applications that require the use of shielded cable.

Figure 9:
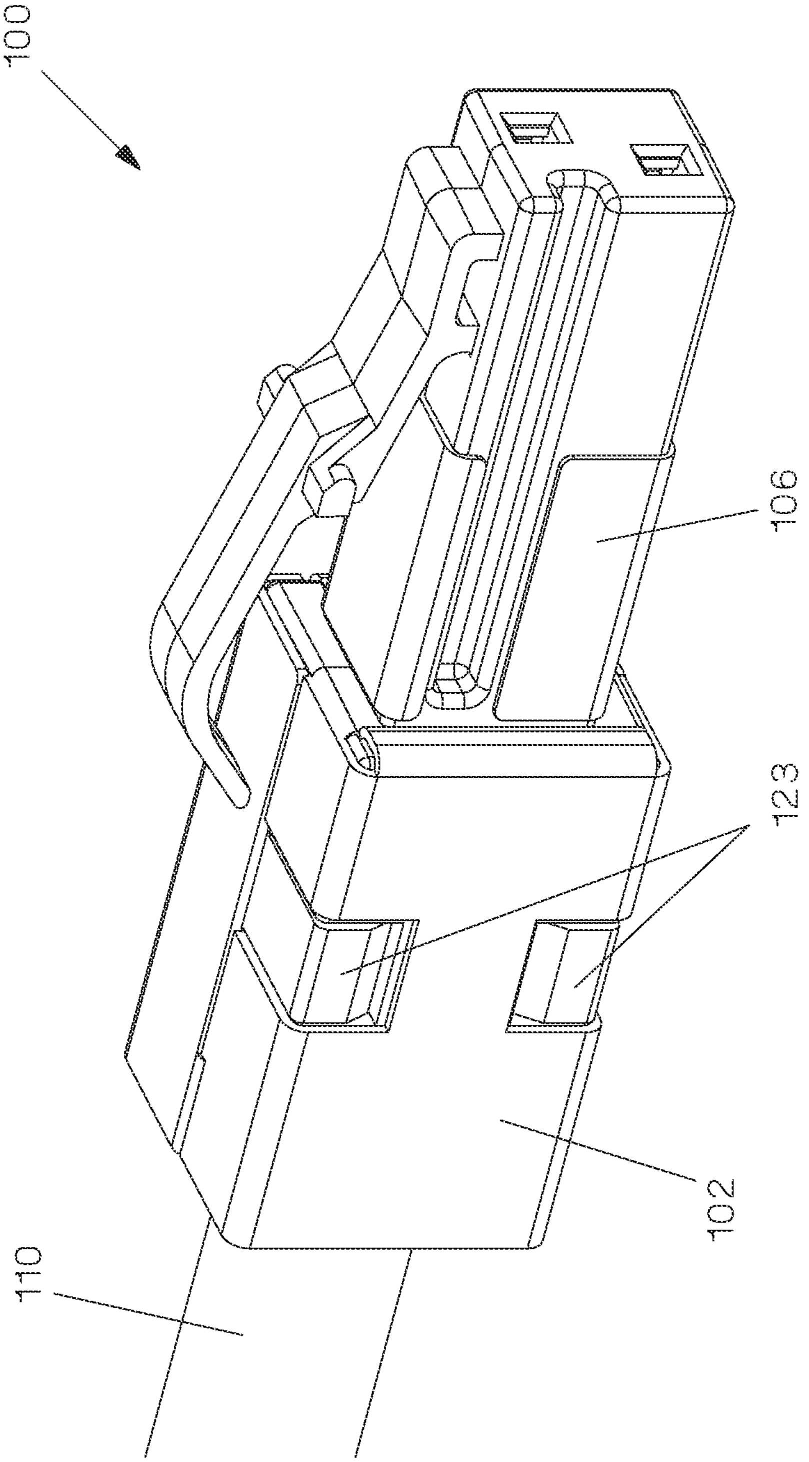
FIG. 9 is an isometric view of a shielded version of the plug of FIG. 1.
Figure 10:
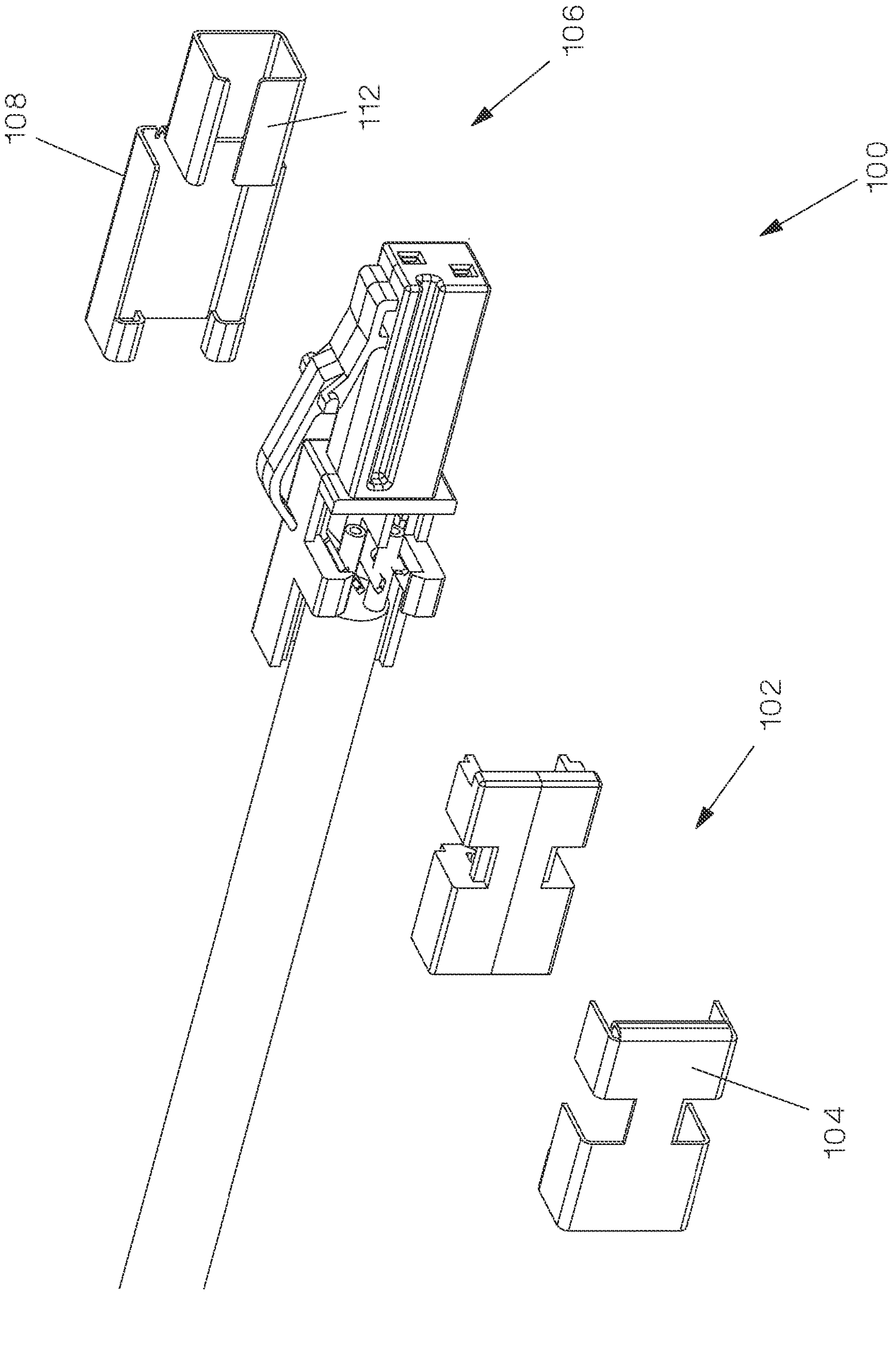
FIG. 10 is an exploded isometric view of the plug of FIG. 9.

FIG. 9 shows a single pair ethernet shielded plug assembly 100 having shielded wire cap 102, shielded main plug assembly 106, and shielded single pair ethernet cable 110. FIG. 10 shows an exploded view of single pair ethernet shielded plug assembly 100. Shielded wire cap 102 has wire cap shield 104, while shielded main plug assembly 106 has main plug shield 108. Main plug shield 108 has front portion 112 which contacts the grounding tabs of the active equipment single pair ethernet jack.

Figure 11:
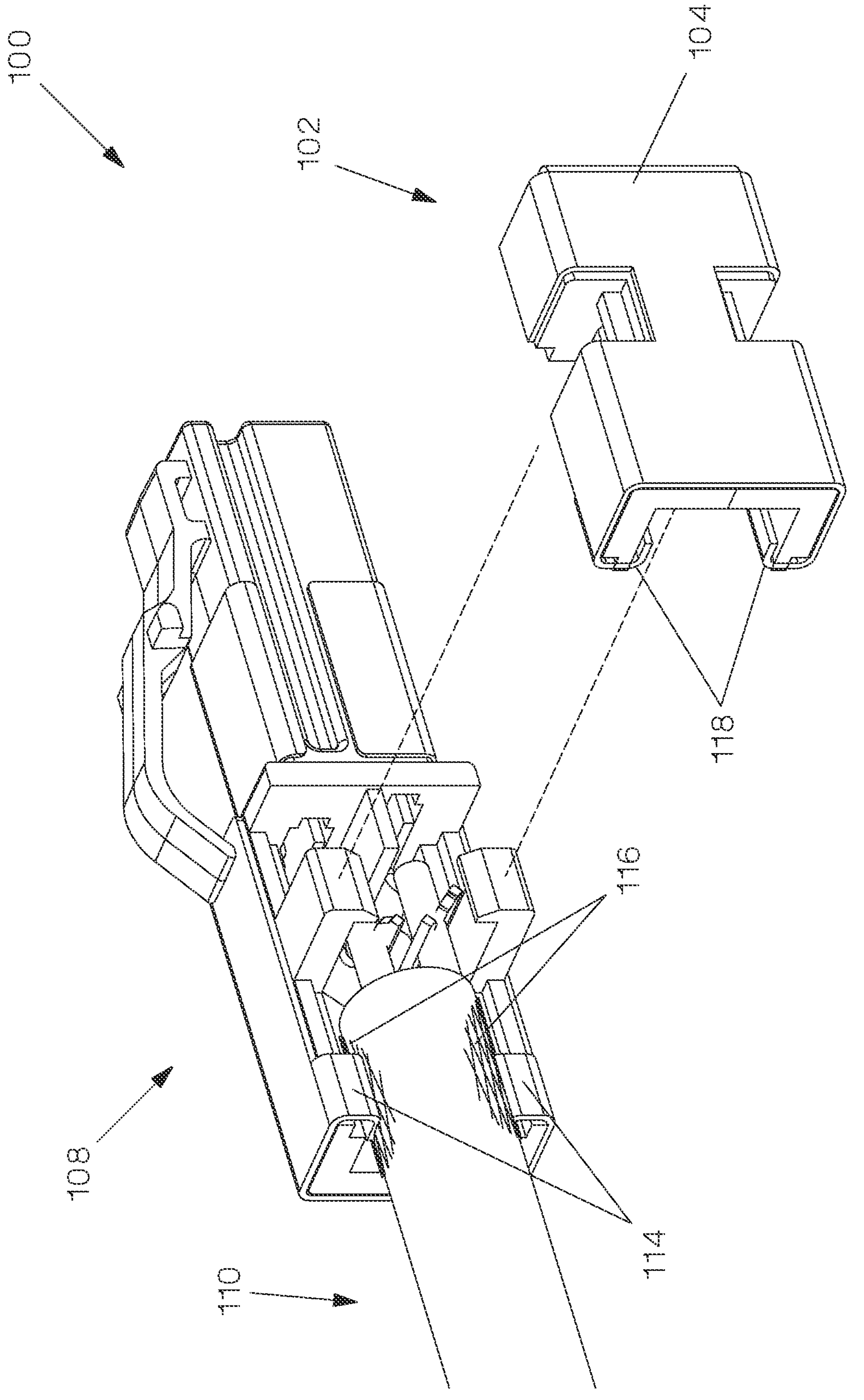
FIG. 11 is an isometric view of the plug of FIG. 9 with the wire cap removed.

FIG. 11 shows a rear view of single pair ethernet shielded plug assembly 100 with shielded wire cap 102 uninstalled. Main plug shield 108 has plug shield tabs 114 that contact both shield braid 116 of shielded single pair ethernet cable 110 as well as the wire cap shield tabs 118 of wire cap shield 104 when installed to create a bonded connection between all three components.

Figure 12:
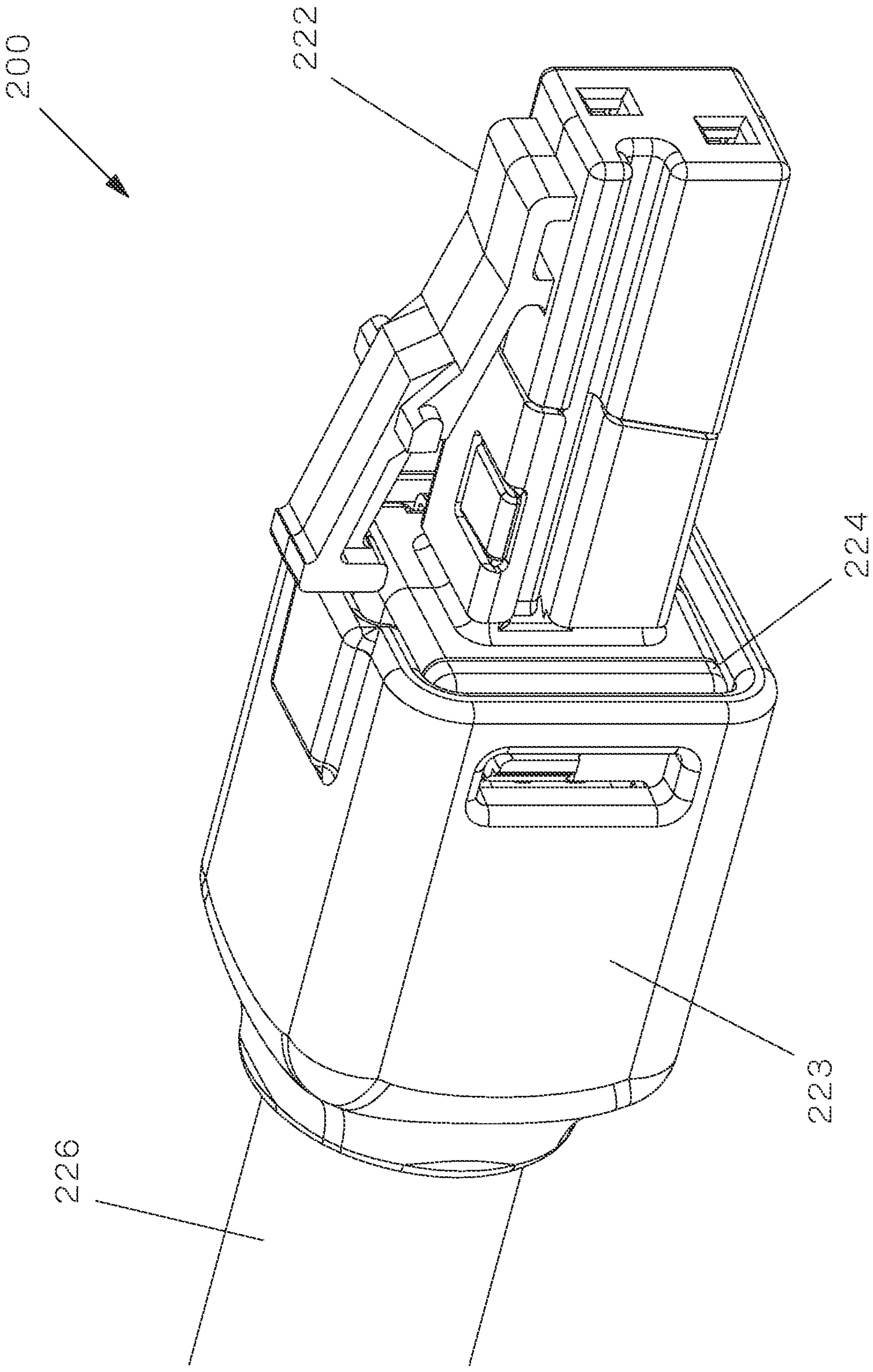
FIG. 12 is an isometric view of a second embodiment of a single pair ethernet plug.

FIG. 12 is an isometric view of a second embodiment of a single pair ethernet plug assembly 220 which includes main plug assembly 222, outer cover 223, wire cap 224, and single pair ethernet cable 226.

Figure 13:
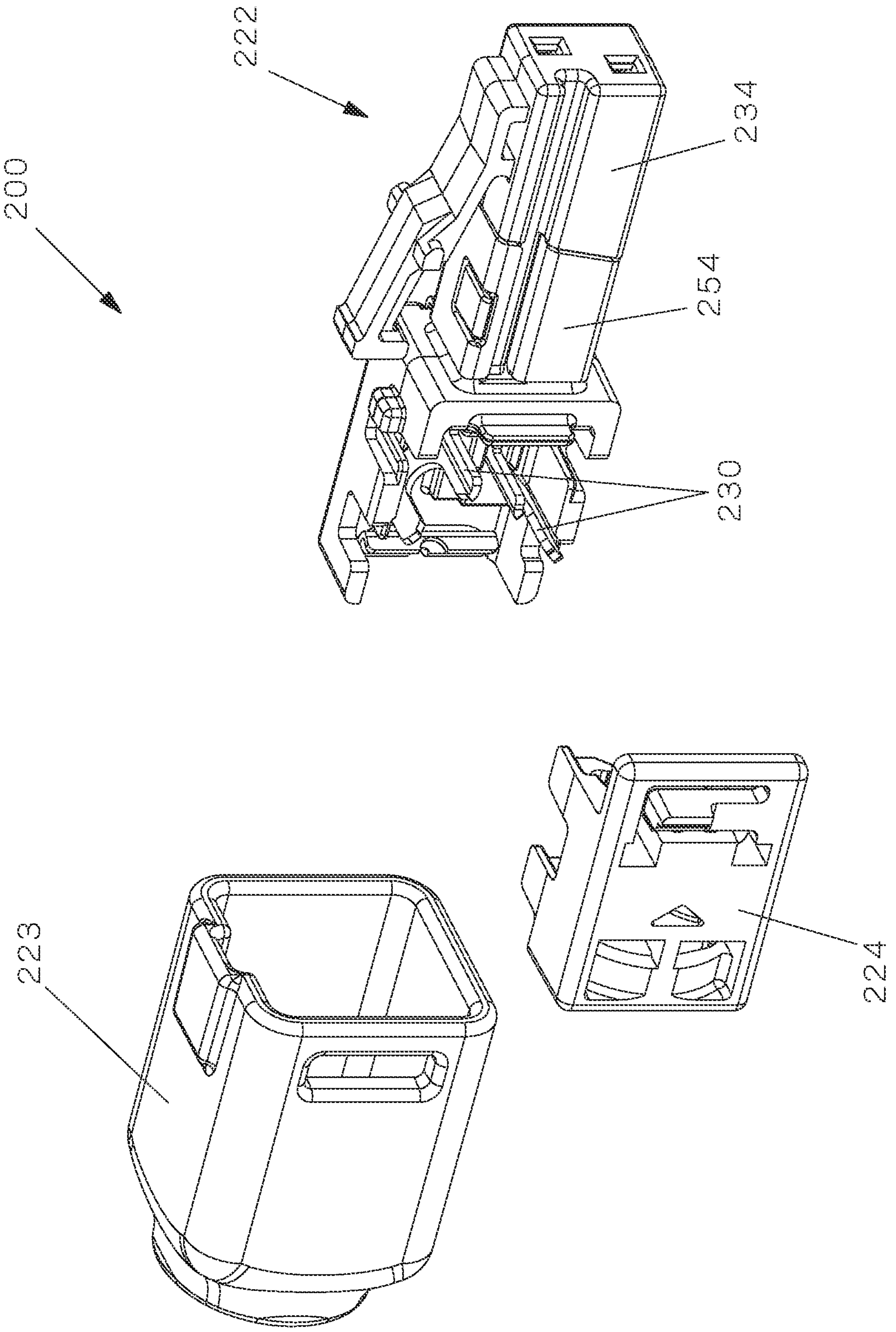
FIG. 13 is an exploded isometric view of the plug of FIG. 12.

FIG. 13 is an exploded view of single pair ethernet plug assembly 220 with outer cover 223 and wire cap 224 uninstalled. Main plug assembly 222 includes contacts 230, main plug body 234, and shield wrap 254.

Figure 14:
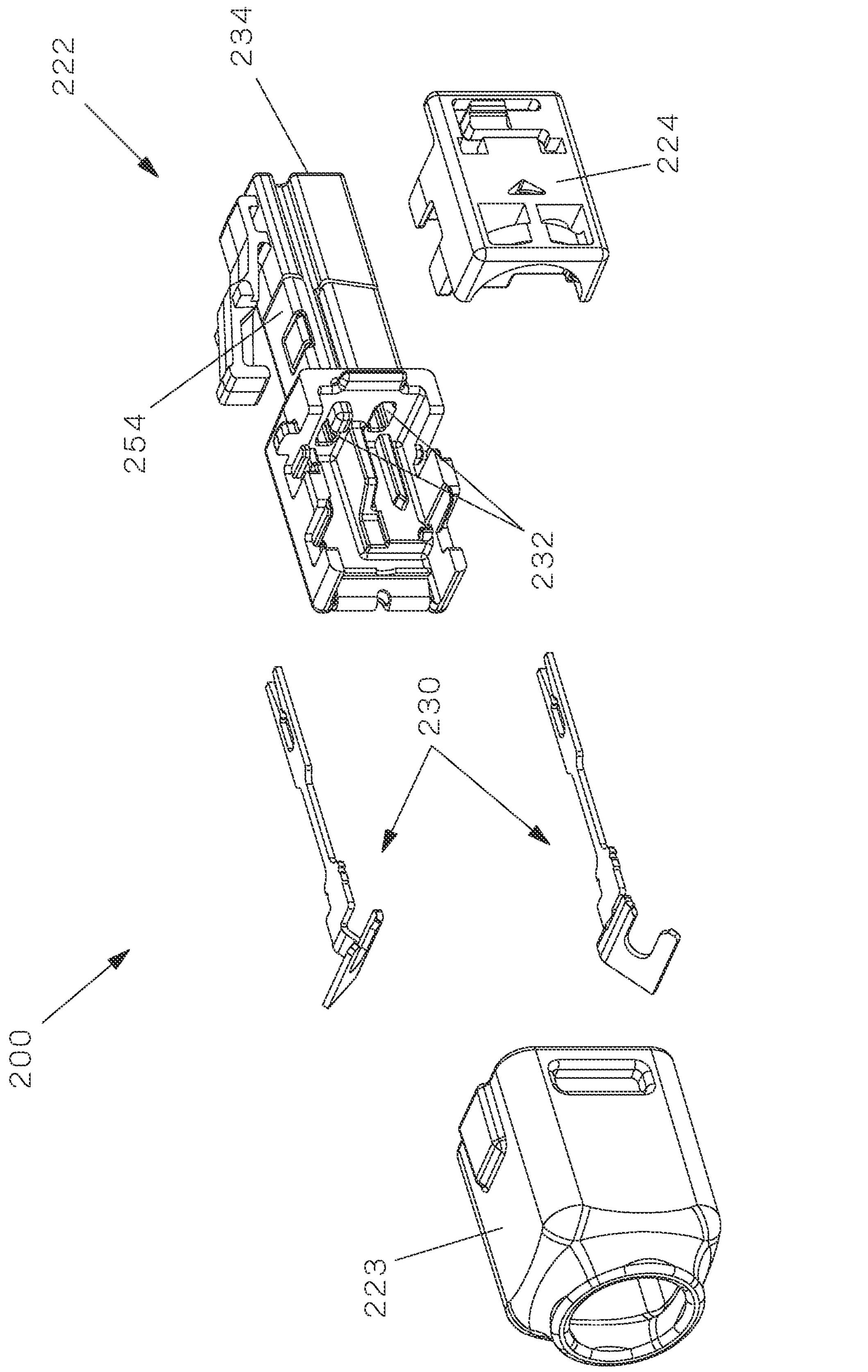
FIG. 14 is another exploded isometric view of the plug of FIG. 12.

FIG. 14 is an exploded view of single pair ethernet plug assembly 220. Contacts 230 are inserted into slots 232 of main plug body 234.

Figure 15:
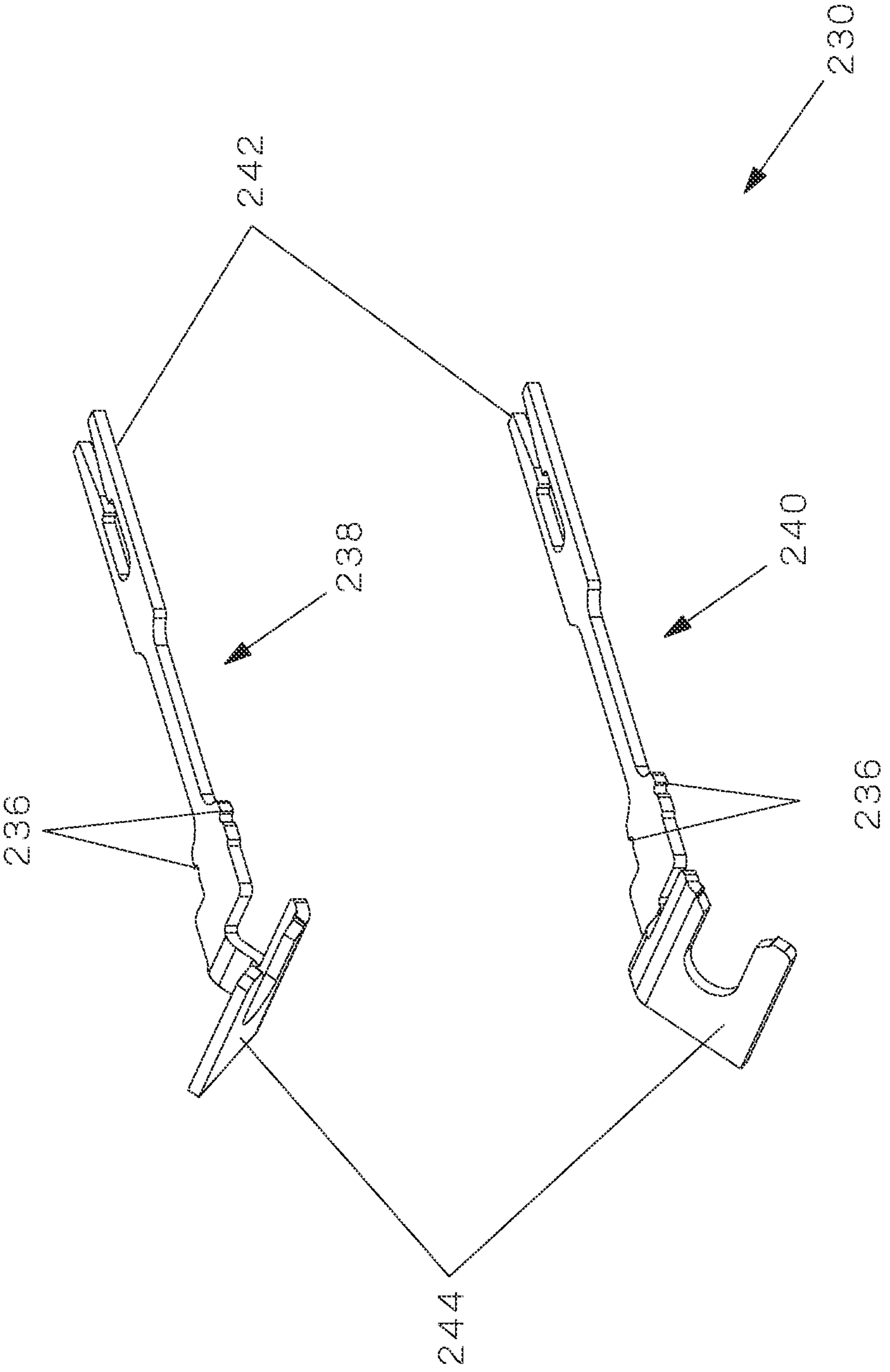
FIG. 15 is an isometric view of the contacts of the plug of FIG. 12.

FIG. 15 is an isometric exploded view of contacts 230; which include upper contact 238 and lower contact 240. Contacts 230 include front interfaces 242 and insulation displacement contacts 244. Front interfaces 242 engage with the contact pins of active equipment jacks.

Insulation displacement contacts 244 pierce the insulation of conductors 227 of single pair ethernet cable 226 to establish electrical continuity. Wire cap 224 aligns conductors 27 (FIG. 20) of single pair ethernet cable 26 with contacts 230 of main plug assembly 222. Insulation displacement contacts 244 are angled relative to the axes of conductors 227 of single pair ethernet cable 226 to facilitate cutting of the conductor insulation without the need for a secondary coining operation to create a cutting edge on insulation displacement contacts 244. Barbs 236 engage into sides of slots 232 of main plug body 234 to retain the contacts within main plug body 234. The lengths of upper contact 238 and lower contact 240 may be equal for electrical balance.

Figure 16:
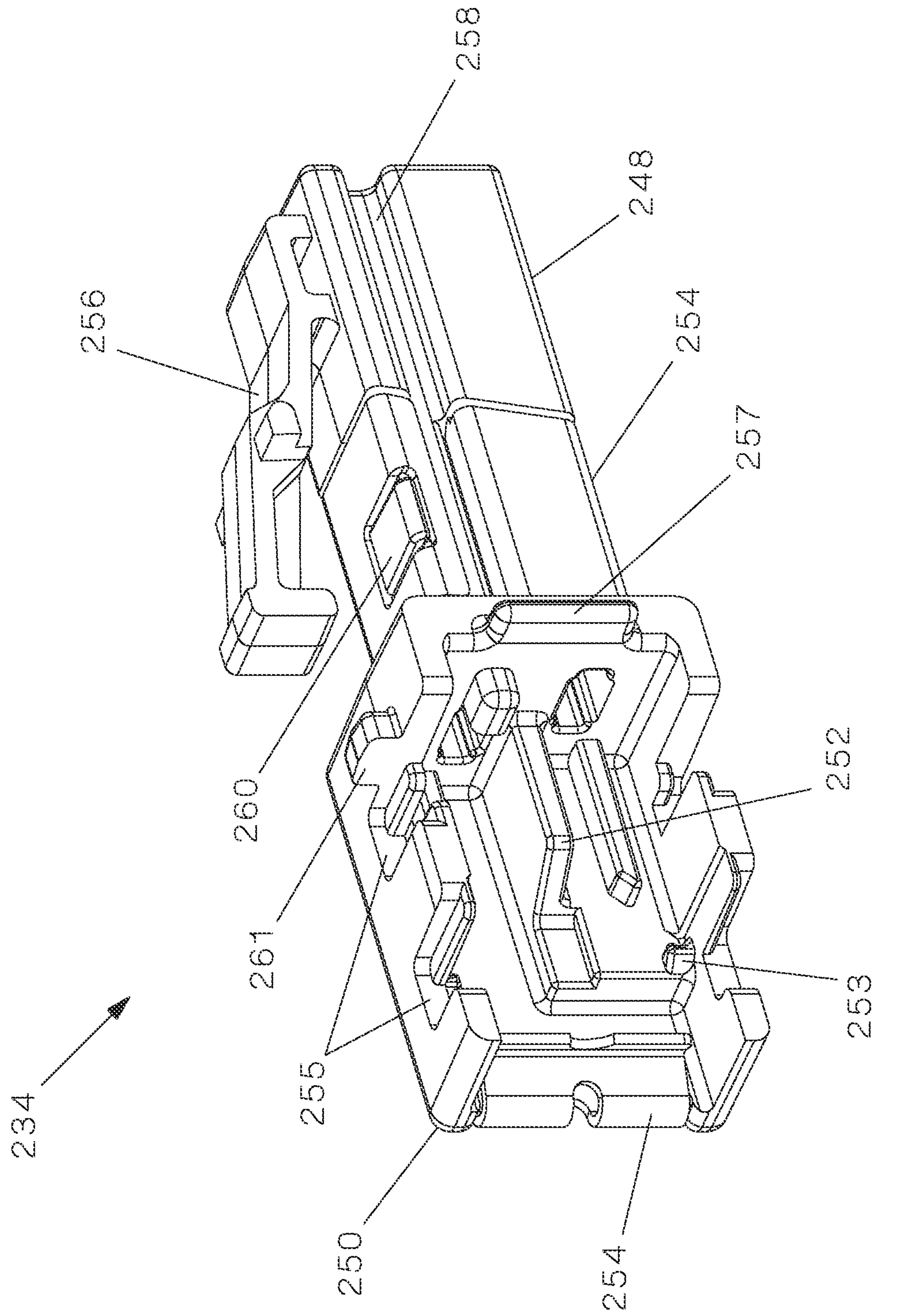
FIG. 16 is an isometric view of the main plug body of the plug of FIG. 12.

FIG. 16 is an isometric view of main plug body 234. Main plug body 234 includes front interface area 248 and rear termination area 250. Rear termination area 250 has dividing wall 252 to separate contacts 230 to prevent shorting and reduce the potential for hi-pot failures between upper contact 238 and lower contact 240. Contact stops 253 of main plug body 234 provide a means of positively locking contacts 230 in main plug body 234 once they are fully inserted.

Shield wrap 254 provides grounding from the front interface area 248 to the rear termination area 250. Latch 256 is based on a fiber LC connector latch and locks single pair ethernet plug assembly 220 into a single pair ethernet jack. Ledge 257 of main plug body 234 engages with pocket 275 on wire cap 224 (FIG. 18) to provide side-to-side rigidity when fully assembled. Keyway 258 on main plug body 234 aligns to a key feature on the single pair ethernet jack. The key feature prevents a fiber LC connector from accidentally being installed into a single pair ethernet jack. Shield retention block 260 on main plug body 234 engages with cutout 262 on shield wrap 254 (FIG. 17) to lock shield wrap 254 onto the front interface area 248 of main plug body 234. Cover key 261 engages with keying pocket 290 on outer cover 223 (FIG. 21) to ensure outer cover 223 is installed in the correct orientation.

Figure 17:
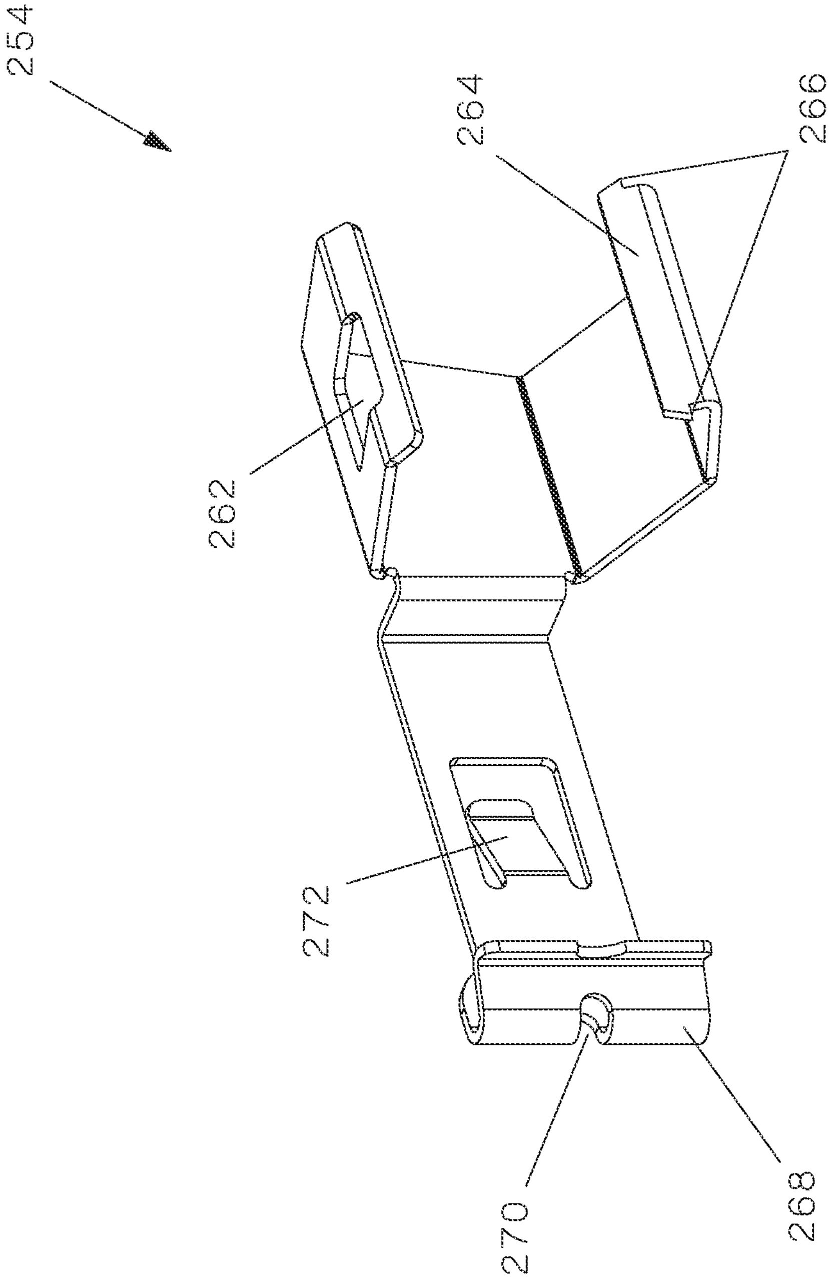
FIG. 17 is an isometric view of the shield wrap of the plug of FIG. 12.

FIG. 17 is an isometric view of shield wrap 254 in an open position. Flange 264 inserts into keyway 258 of main plug body 234 and locks using barb features 266. The rear portion of shield wrap 254 has a wraparound flange 268 with cable braid retention notch 270 to locate the single pair ethernet shielding braid and provide electrical bonding between the cable braid and plug shield wrap 254. Spring tab 272 makes contact with inside surface 292 of outer cover 223 (FIG. 21) for electrical grounding.

Figure 18:
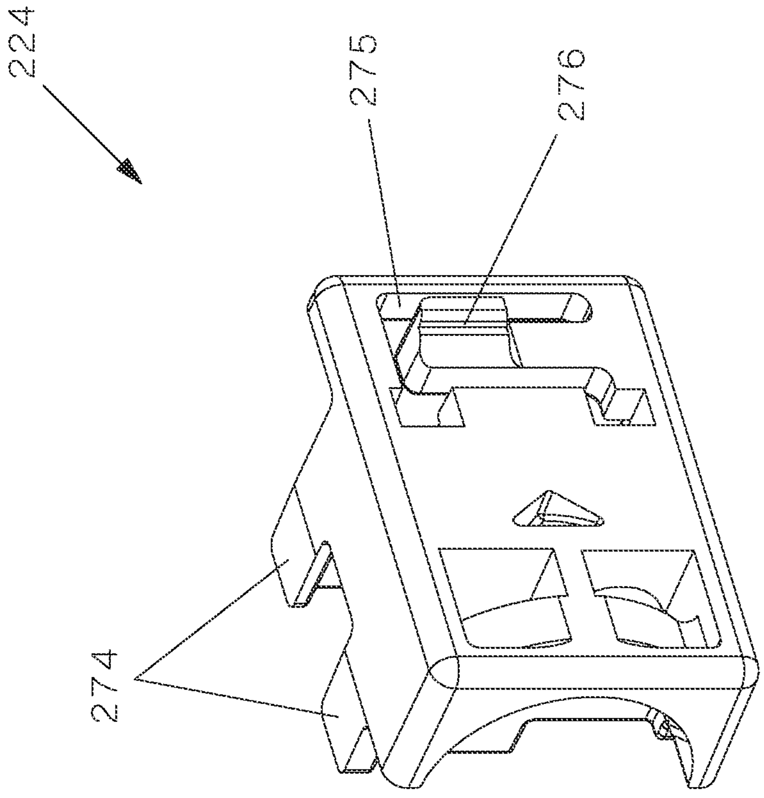
FIG. 18 is an isometric view of the wire cap of the plug of FIG. 12.

FIG. 18 is an isometric view of wire cap 224. Alignment blocks 274 of wire cap 224 engage with alignment notches 255 of main plug body 234 to guide conductors 227 of single pair ethernet cable 226 prior to termination to avoid damage to contacts 230. Latch 276 on wire cap 224 engages with slot 288 on outer cover 223 to lock outer cover 223 over wire cap 224 and main plug assembly 222 to hold all components together. Pressing latch 276 inward allows the user to remove outer cover 223. Disassembling all components provides the end user with the option to re-terminate single pair ethernet plug assembly 220.

Figure 19:
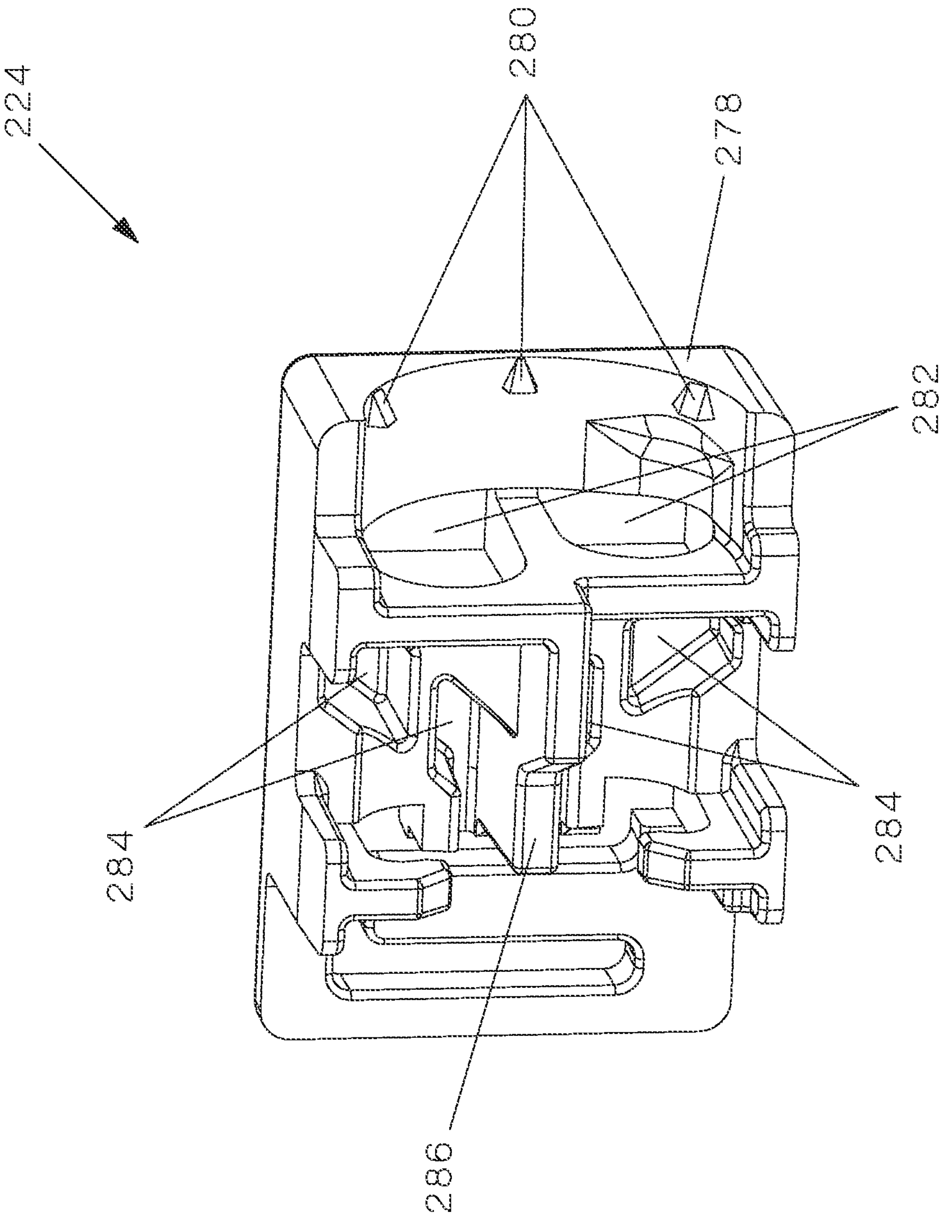
FIG. 19 is an isometric view of the wire cap of FIG. 18 rotated 180 degrees.

FIG. 19 is a rotated isometric view of wire cap 224. Tooth features 280 on strain relief area 278 of wire cap 224 are designed to grip outer jacket 229 of single pair ethernet cable 226 to secure single pair ethernet cable 226 within single pair ethernet plug assembly 220. Conductor passages 282 guide conductors 227 of single pair ethernet cable 226 along the length of wire cap 224 to secure and align conductors 227 with insulation displacement contacts 244 of contacts 230 in main plug assembly 222. Pockets 284 on wire cap 224 provide clearance for the tips of insulation displacement contacts 244 of contacts 230 in main plug assembly 222. Dividing wall 286 on wire cap 224 lines up with dividing wall 252 on main plug body 234 to completely separate conductors 227 of single pair ethernet cable 226.

Figure 20:
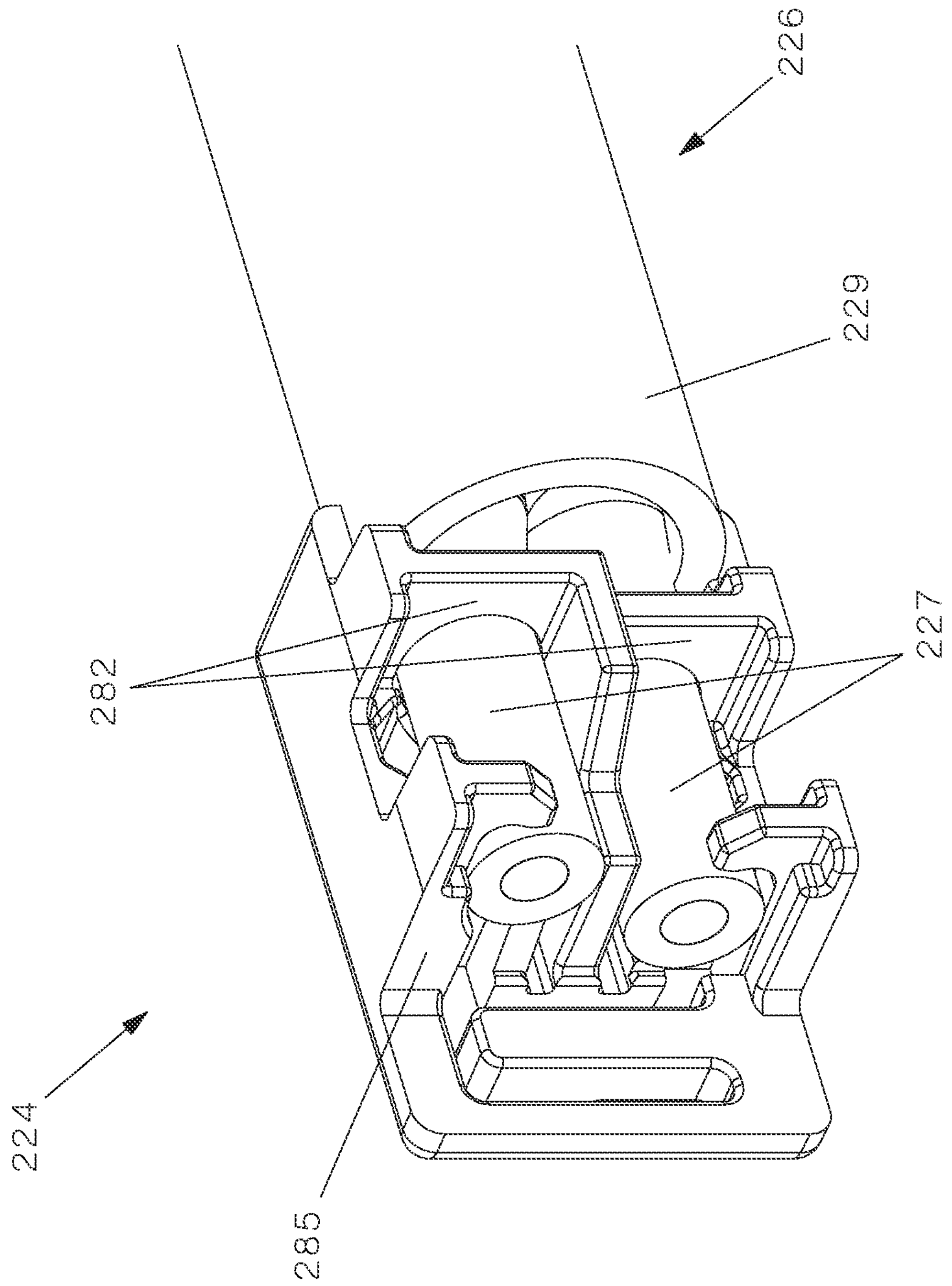
FIG. 20 is an isometric view of the wire cap of FIG. 19 with an inserted communication cable.

FIG. 20 is an isometric view of wire cap 224 with conductors 227 of single pair ethernet cable 226 installed. Conductors 227 are inserted into conductor passages 282 and trimmed flush with wall 285 on wire cap 224.

Figure 21:
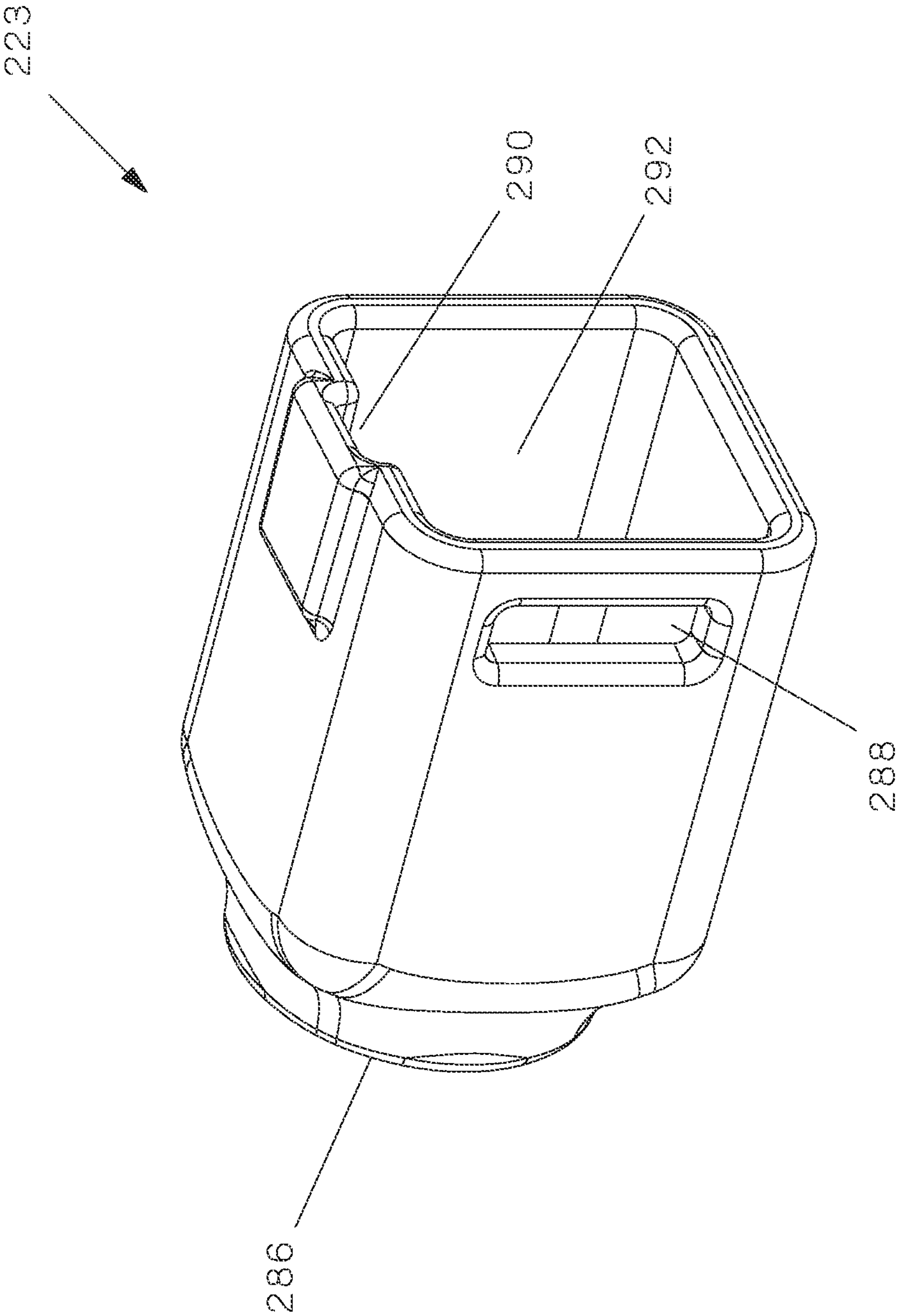
FIG. 21 is an isometric view of the outer cover of the plug of FIG. 12.

FIG. 21 is an isometric view of outer cover 223. Outer cover 223 is made of die cast metal for shielding and strength. Single pair ethernet cable 226 enters through cable entry area 286 of outer cover 223 prior to termination.

The single pair ethernet plug may be offered in a non-shielded version as a lower cost solution for applications that do not require the performance of a shielded system.

Figure 22:
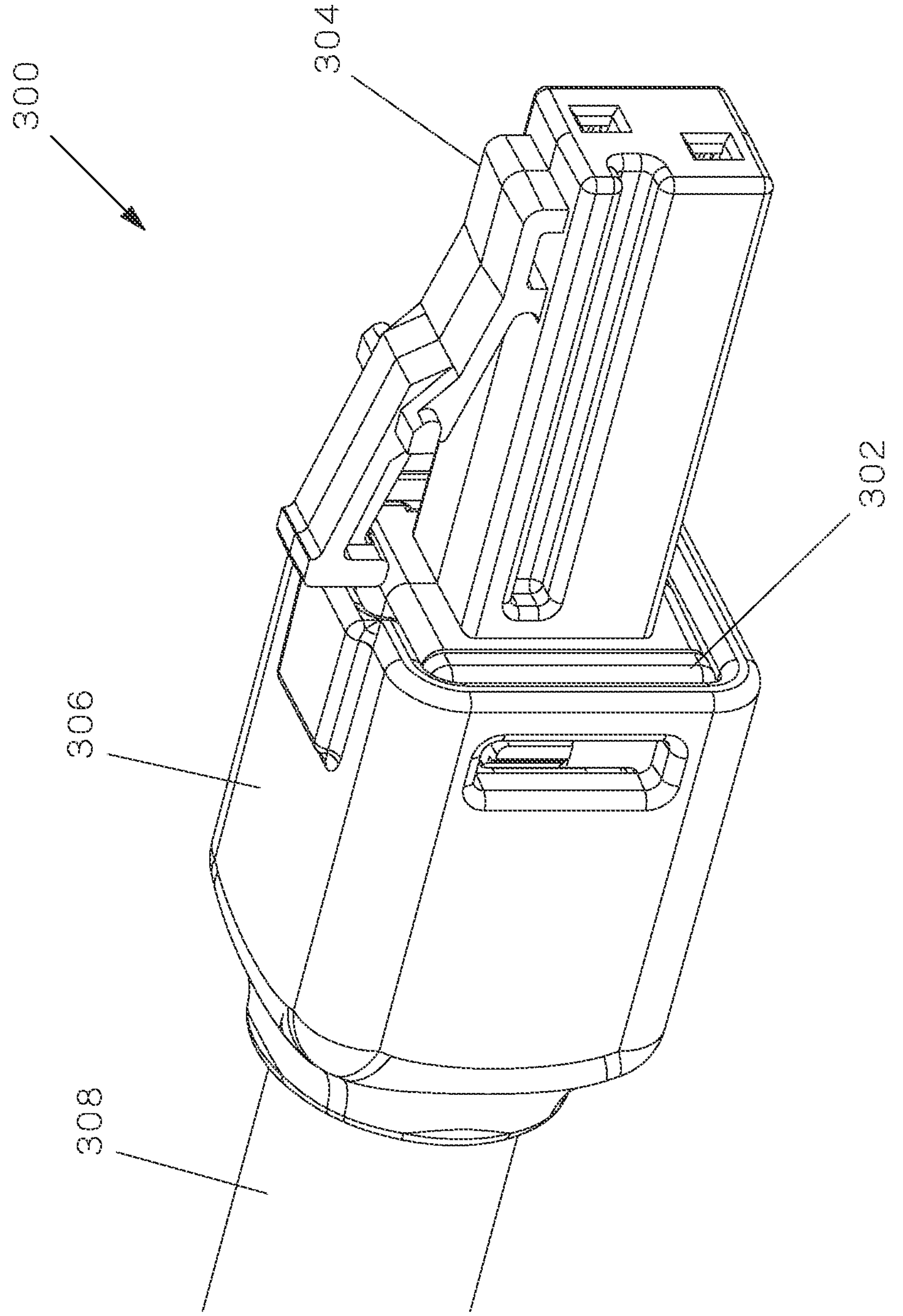
FIG. 22 is an isometric view of an unshielded version of the plug of FIG. 12

FIG. 22 shows a single pair ethernet unshielded plug assembly 300 which includes wire cap 302, main plug assembly 304, rear cover 306, and unshielded single pair ethernet cable 308.

Figure 23:
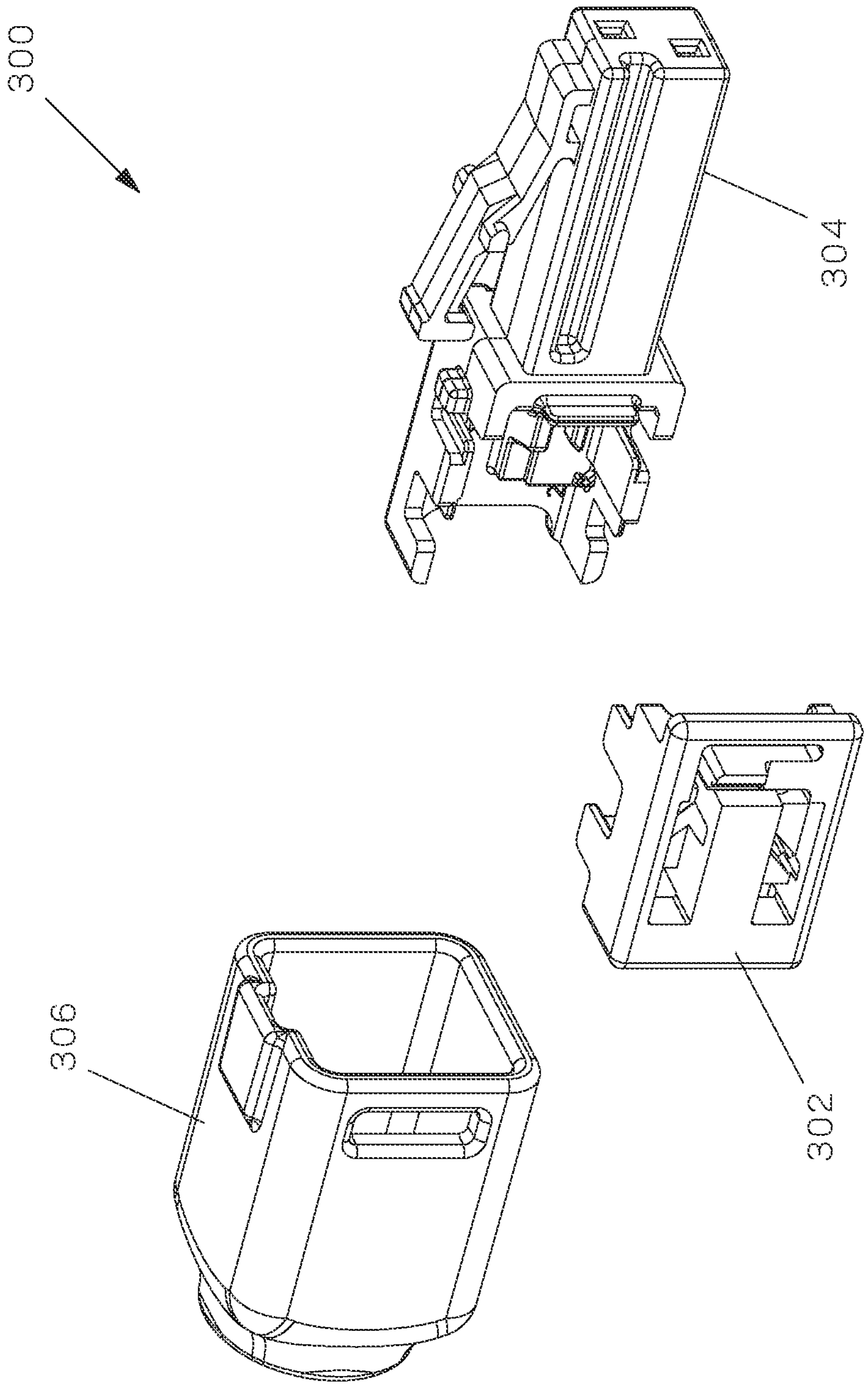
FIG. 23 is an exploded isometric view of the plug of FIG. 22.

FIG. 23 shows an exploded view of single pair ethernet unshielded plug assembly 300. In this configuration, main plug assembly 304 does not have a metal shield wrap and rear cover 306 is plastic instead of die cast metal.

Figure 24:
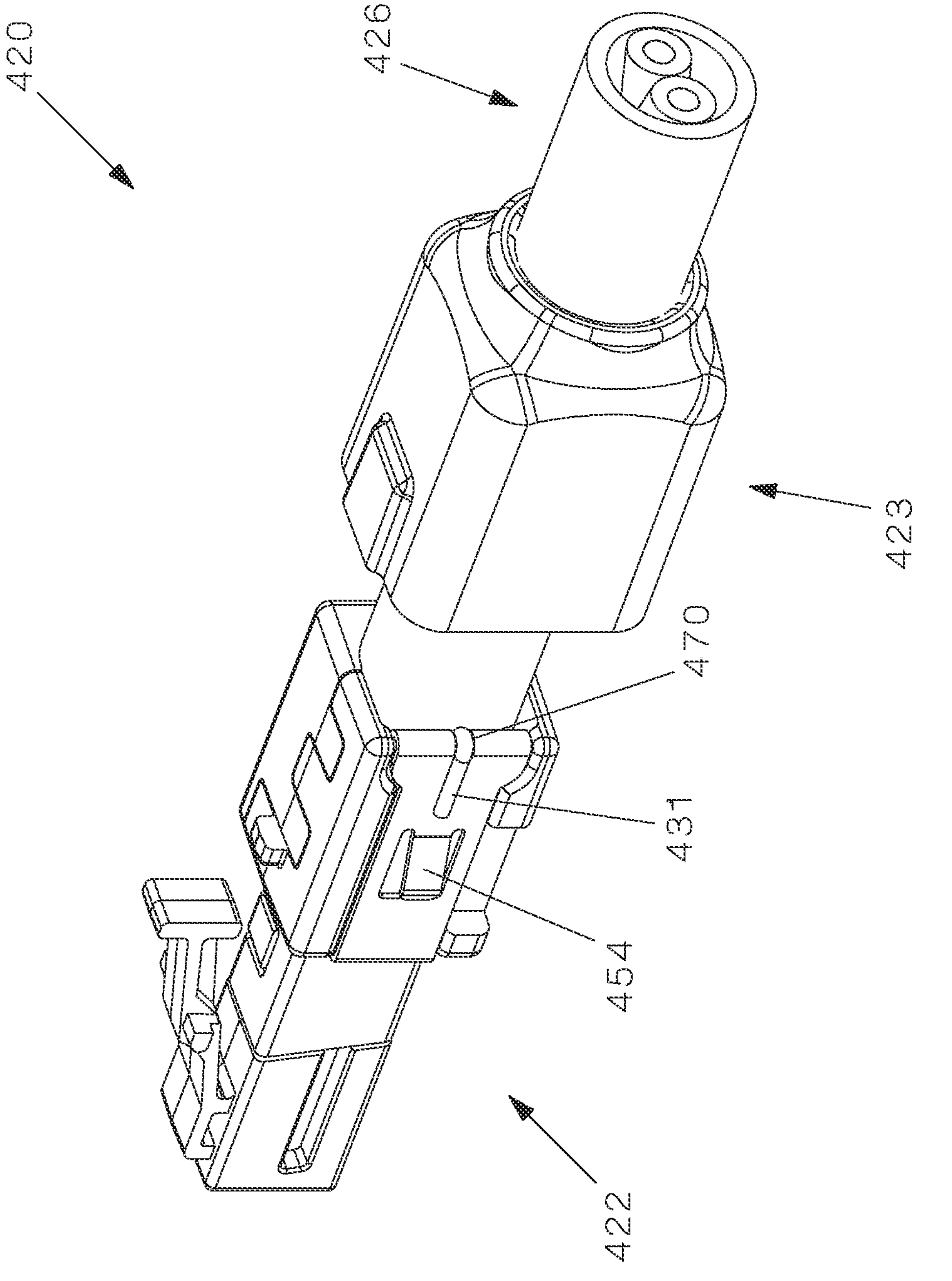
FIG. 24 is an isometric view of the plug of FIG. 12 showing how a drain wire can be terminated.

FIG. 24 shows single pair ethernet plug assembly 420 with outer cover 423 pulled back to expose the drain wire 431 of single pair ethernet cable 426. Drain wire 431 is pulled back alongside the outer jacket of single pair ethernet cable 426 during cable preparation and inserted into main plug assembly 422. The drain wire is then routed into drain wire retention notch 470 of shield wrap 454 and around the outside of the shield wrap such that when outer cover 423 is moved forward over the main plug assembly, drain wire 431 is captured between outer cover 423 and shield wrap 454 to establish grounding continuity between the cable and plug assembly.

Figure 25:
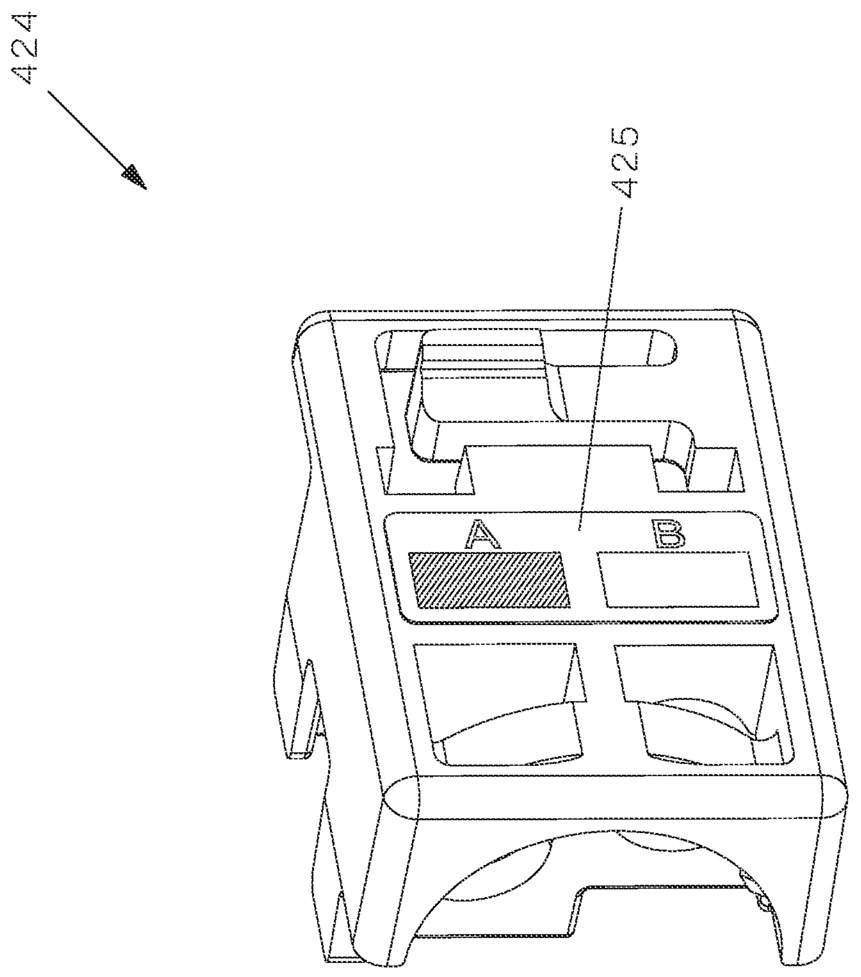
FIG. 25 is an isometric view of a wire cap that may be used with the present invention having an adhesive label to show polarity.

FIG. 25 shows wire cap 424 having adhesive label 425 applied to the outside face of the component. Adhesive label 425 may have colors and/or text to indicate the location of the conductors of single pair ethernet 426 to ensure correct signal polarity.

Figure 26:
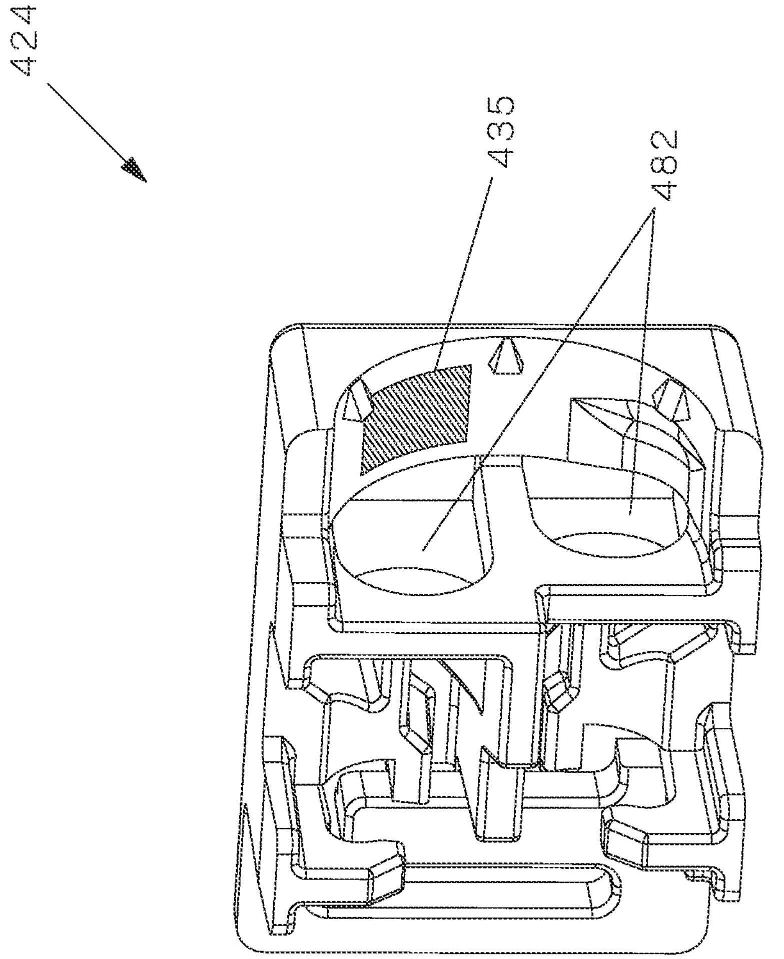
FIG. 26 is an isometric view of another wire cap that may be used with the present invention having ink based markings to show polarity.

FIG. 26 shows another method for indicating signal wire routing within wire cap 424. Ink based marking 435 is applied to the inner area of wire cap 424, which aligns with one of the two conductor passages 482 and corresponds to the color of one of the conductors of single pair ethernet cable 246 to indicate signal wire routing. In one embodiment, the contact closest to the latch can have a positive polarity according to IEEE 802.3cg.

Figure 27:
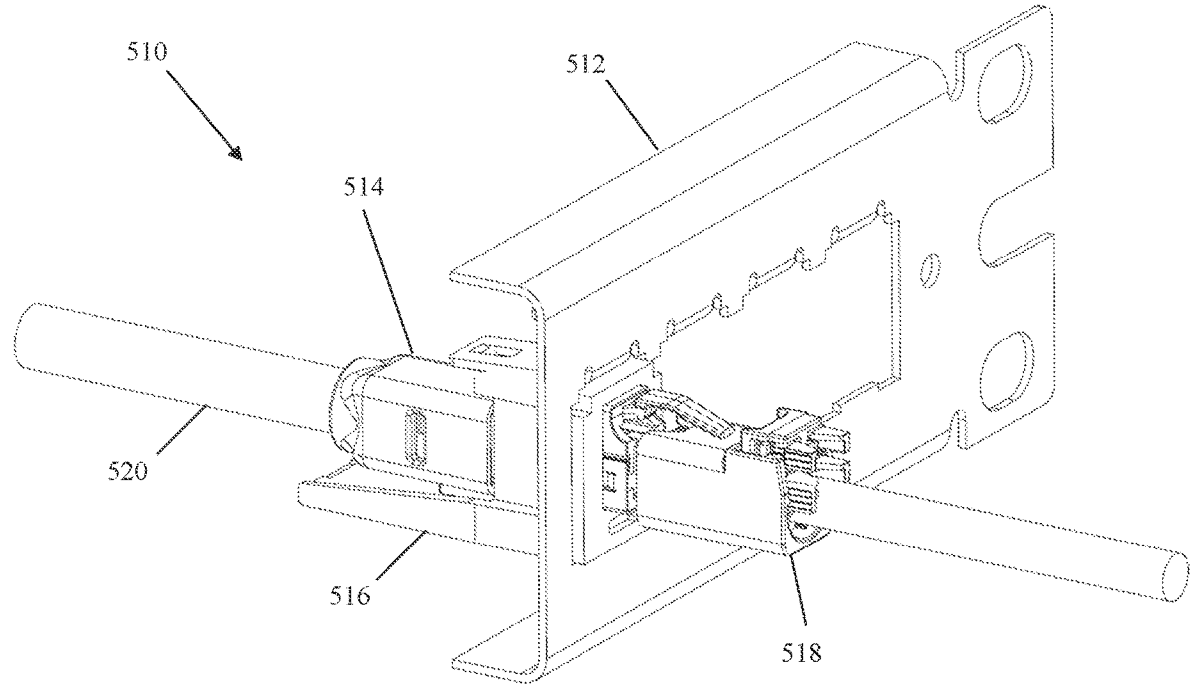
FIG. 27 is an isometric view of the plug of FIG. 1 being inserted into a first embodiment of a single pair ethernet jack using a similar termination setup as the aforementioned plug.

FIG. 27 is an isometric view of communications system 510 which includes panel 512, a first embodiment of single pair ethernet jack 514, Mini-Com adapter 516, single pair ethernet plug 518, and ethernet cable 520.

Figure 28:
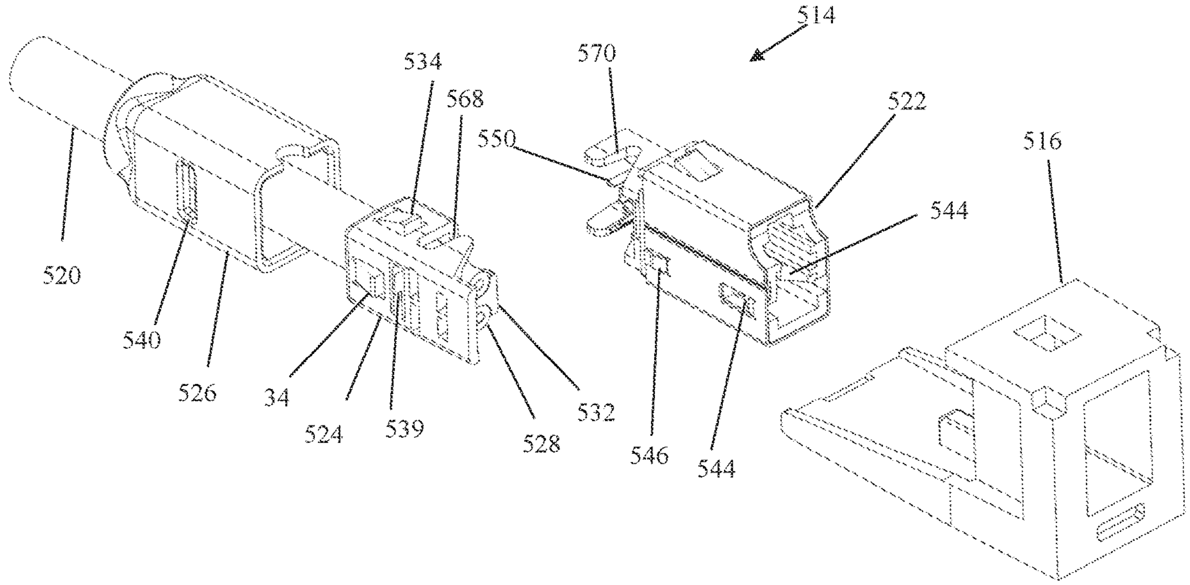
FIG. 28 is a semi-exploded view of the jack shown in FIG. 27.

FIG. 28 is an exploded isometric view of termination cap 524, rear cover 526, and ethernet cable 520 ready to be mated with shielded jack body 522. Ethernet cable 520 is prepared so that conductors 528 are exposed. Rear cover 526 is slipped over ethernet cable 520 and then termination cap 524 is placed on the end of ethernet cable 520 so that conductors 528 pass through conductor channels 530. Conductors 528 are held in place via retention tabs 532. Termination cap 524 with ethernet cable 520 and conductors 528 are then mated to the back of shielded jack body 522, terminating conductors 528 with plug interface contacts 548 and insulation displacing contacts 550. Rear cover 526 is then slid forward toward shielded jack body 522. Cap strain relief toggles 534 are then pushed inward to grip ethernet cable 520 to provide strain relief Cover retention snap 539 will engage cover retention slot 540, locking rear cover 526 to the rear of single pair ethernet jack 514 and holding cap strain relief toggles 534 engaged with ethernet cable 520. Plug grounding tabs 544 contact the body of single pair ethernet plug 518. Jack grounding tabs 546 contact Mini-Com adapter 516.

Figure 29:
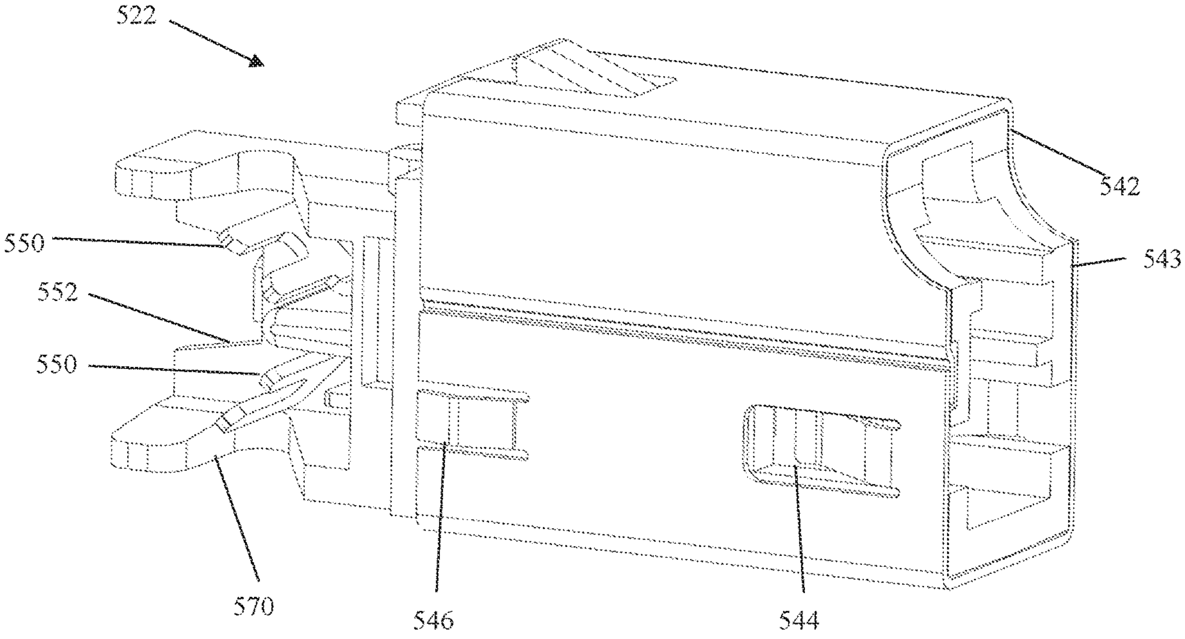
FIG. 29 is an isometric view of the shielded jack body of the SPE jack of FIG. 28.

FIG. 29 is an isometric view of shielded jack body 522 comprised of jack shield 542, jack housing 543, plug interface contacts 548, and insulation displacing contacts 550.

Figure 30:
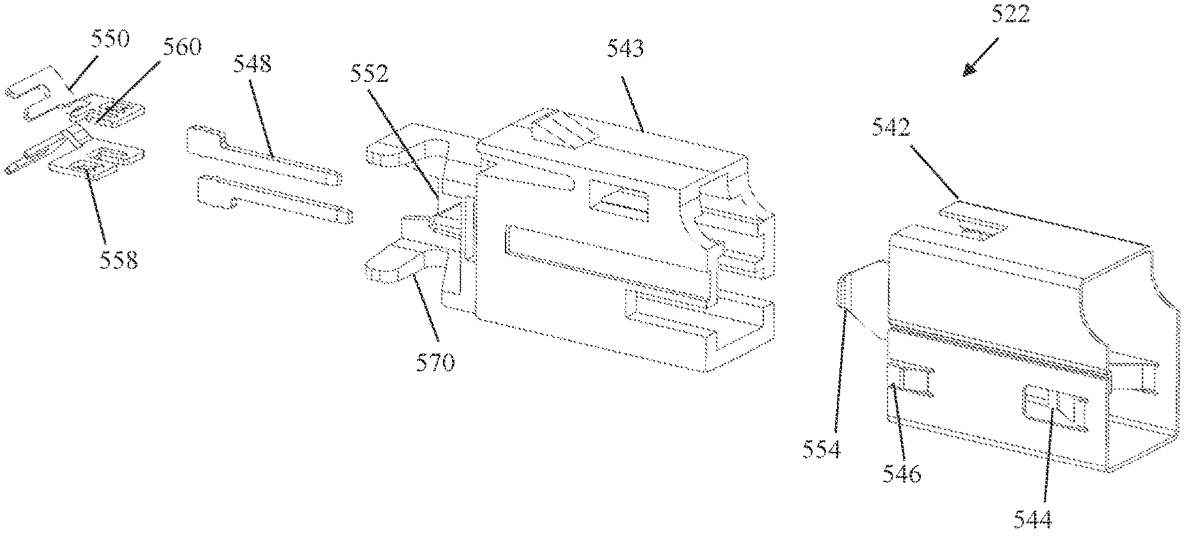
FIG. 30 is an exploded isometric view of the shielded jack body of FIG. 29.

FIG. 30 is an exploded isometric view of shielded jack body 522 comprised of jack shield 542, jack housing 543, plug interface contacts 548, and insulation displacing contacts 550. Plug interface contacts 548, are inserted into jack housing 543. Insulation displacing contacts 550 are inserted into jack housing 543 and create a continuous electrical connection with plug interface contacts 548 at PIC/IDC contact point 560. Contact retention ramps 558 lock insulation displacing contacts 550 and plug interface contacts 548 in jack housing 543. Insulation displacing contacts 550 terminate with conductors 528 inside ethernet cable 520. There are two separate sets of plug interface contacts 548 and insulation displacing contacts 550 to accommodate the pair of ethernet channels. The shield braid of ethernet cable 520 passes through braid slot 552 in jack housing 543 and contact jack shield 542 at braid tab 554. When mated with shielded jack body 522, rear cover 526 touches jack grounding tab 546 on jack shield 542.

Figure 31:
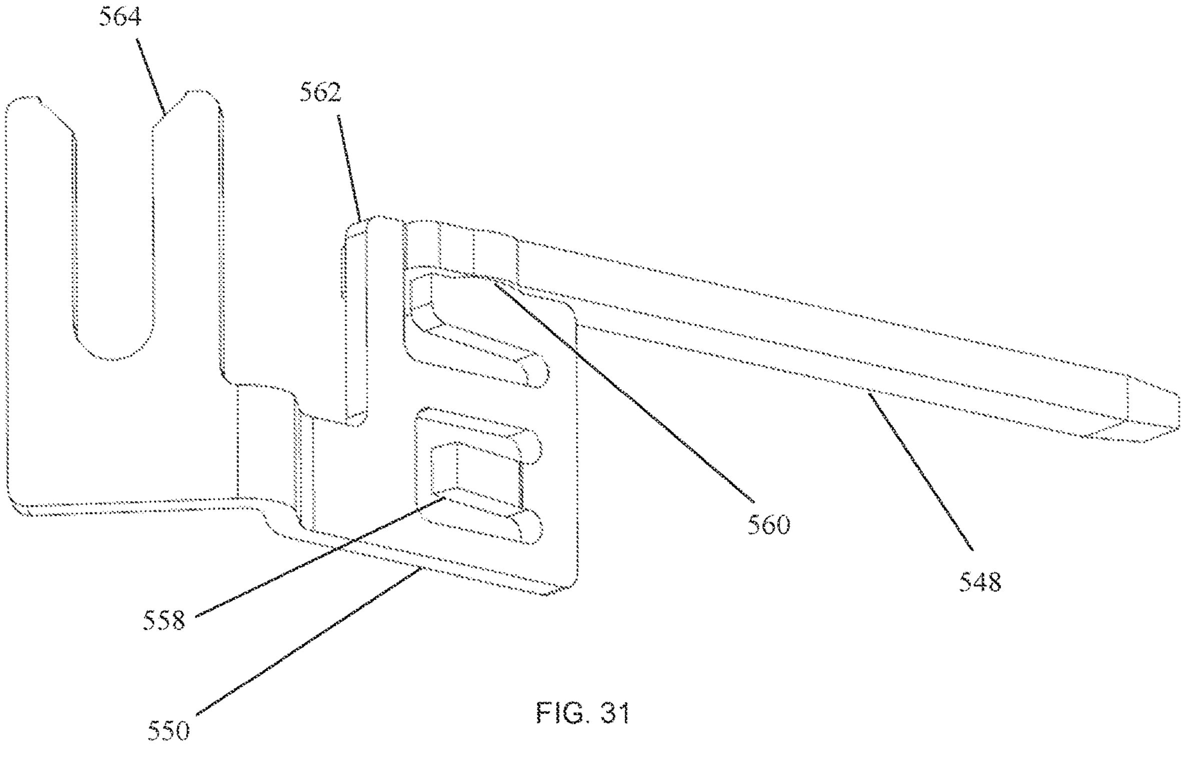
FIG. 31 is an isometric view of one set of plug interface contacts for the shielded jack body of FIG. 28 and insulation displacing contacts creating an electrical connection at PIC/IDC contact point.

FIG. 31 is an isometric view of one set of plug interface contacts 548 and insulation displacing contacts 550 creating an electrical connection at PIC/IDC contact point 560. PIC retention shoulder 562 on insulation displacing contact 550 serves to hold plug interface contact 548 in jack housing 543. Plug interface contact 548 is fabricated from a 0.020" thick conductive metallic material in order to properly mate with contacts inside single pair ethernet plug 518. Insulation displacing contact 550 is fabricated from 0.014" thick conductive metallic material in order to be flexible enough to be bent into the necessary shape and thin enough so that tines 564 can properly displace the insulation on conductors 528.

Figure 32:
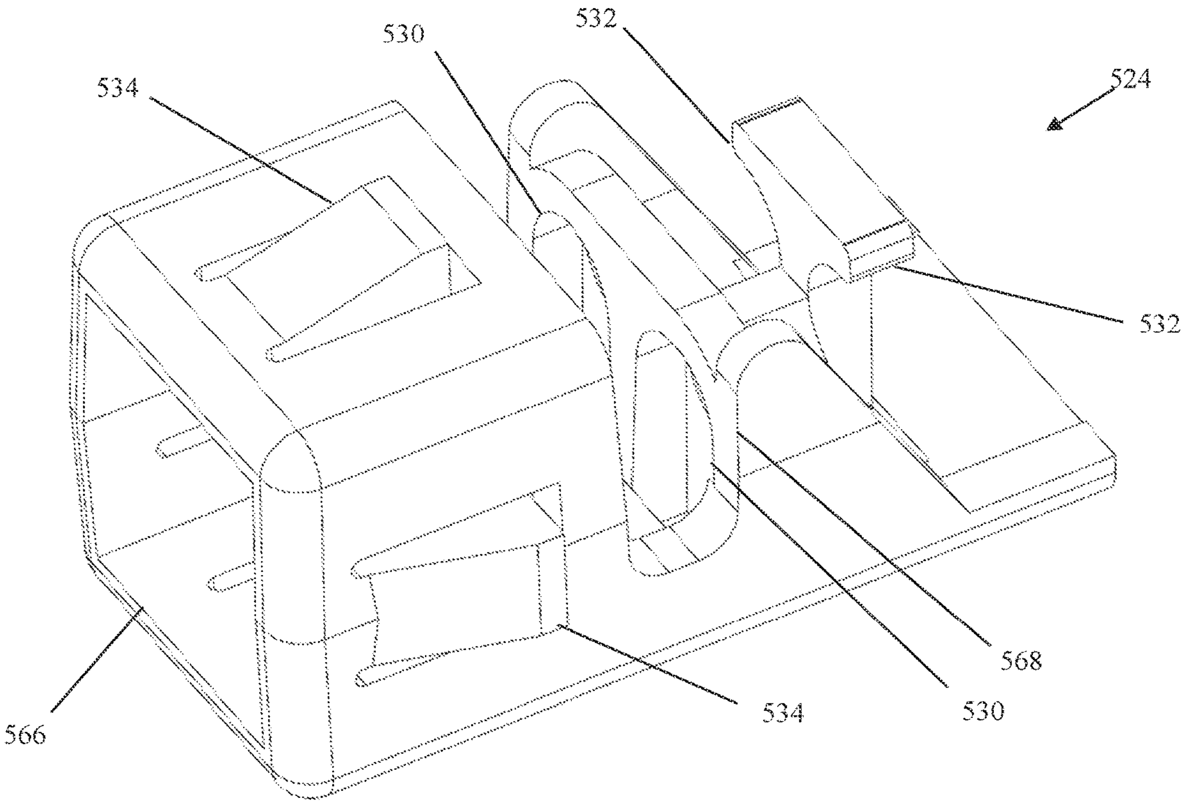
FIG. 32 shows an isometric view of a termination cap for the SPE jack of FIG. 28.

FIG. 32 shows a detailed isometric view of termination cap 24. Ethernet cable 20 is inserted through cable entry 66. Conductors 28 are fed through conductor channels 30 and held in place via retention tabs 32. Cap strain relief toggles 34 are shown in resting position but tip inward to grip ethernet cable 20 when rear cover 26 is slid forward to locking position. Cap strain relief shoulder 68 interlocks with jack strain relief shoulder 70 to ensure that tensile forces acting on ethernet cable 20 are limited to the ethernet cable 20 jacket and not the termination between conductors 28 and insulation displacing contact 50.

Figure 33:
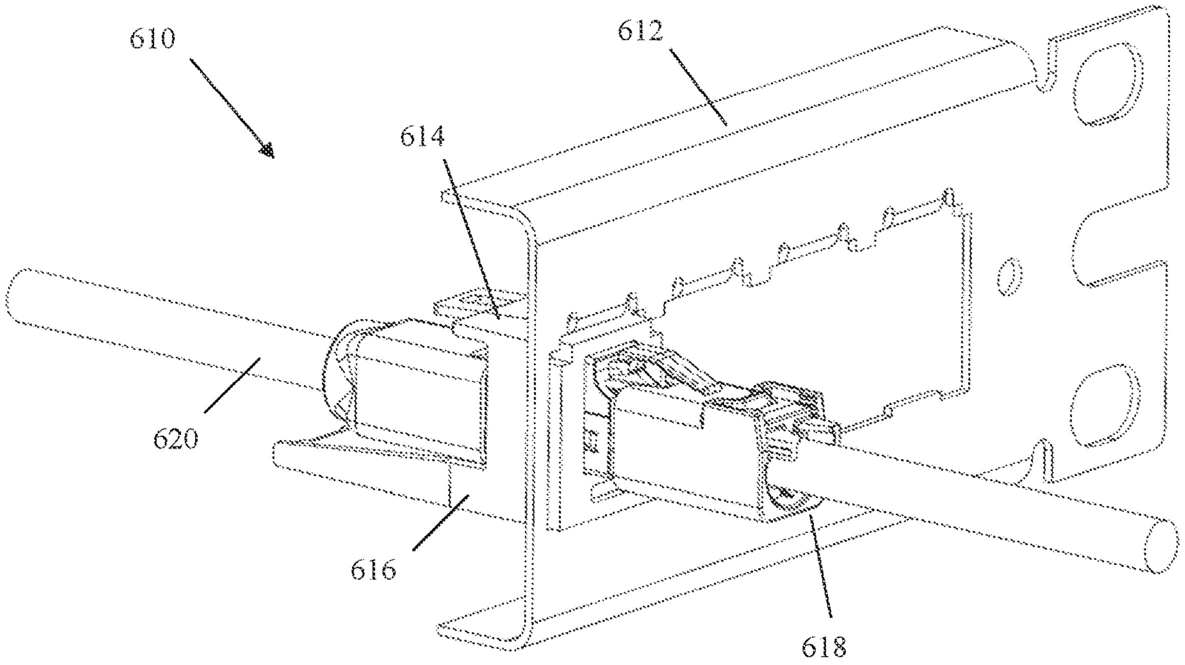
FIG. 33 is an isometric view of the plug of FIG. 1 being inserted into a second embodiment of a single pair ethernet jack using a similar termination setup as the aforementioned plug.

FIG. 33 is an isometric view of communications system 610 which includes panel 612, a second embodiment of single pair ethernet jack 614, Mini-Com adapter 616, single pair ethernet plug 618, and ethernet cable 620.

Figure 34:
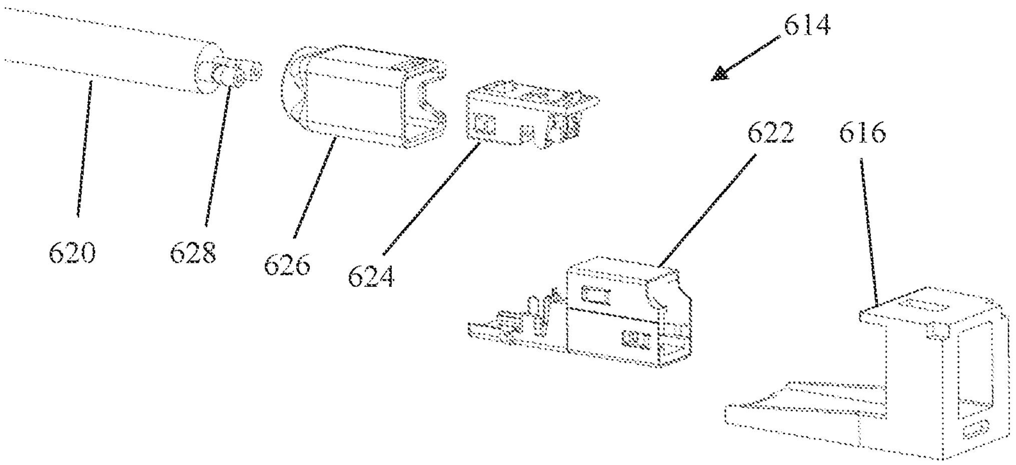
FIG. 34 is an exploded isometric view of the jack of FIG. 33.

FIG. 34 is an exploded isometric view of single pair ethernet jack 614 which is comprised of shielded jack body 622, termination cap 624, and rear cover 626.

Figure 35:
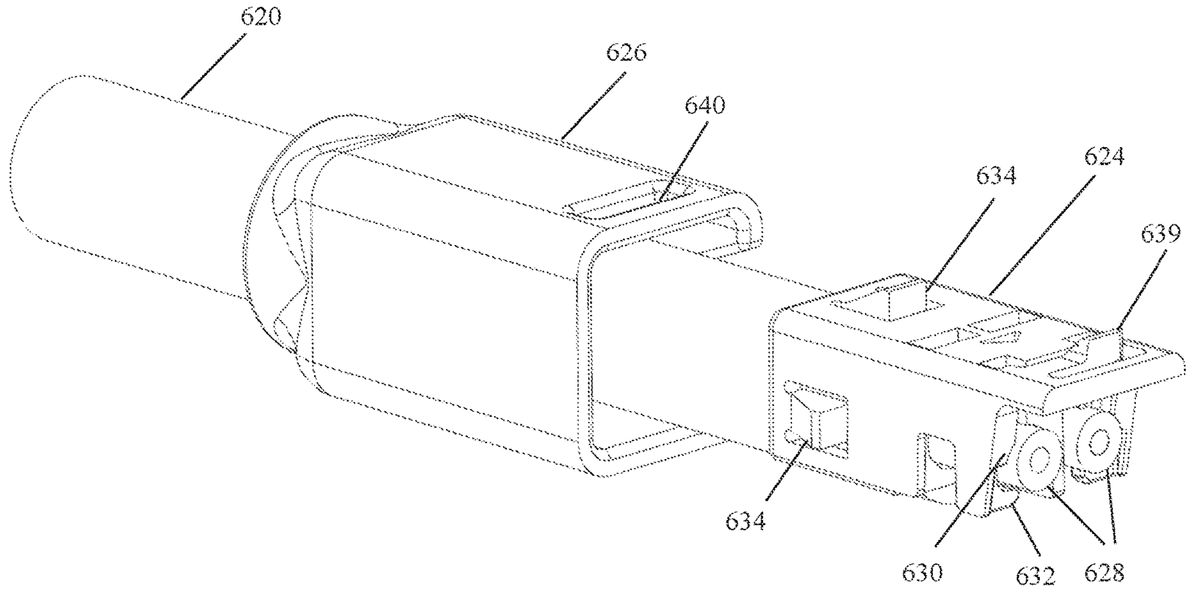
FIG. 35 is an isometric view of the termination cap of the jack of FIG. 33 attached to a cable.

FIG. 35 is an isometric view of termination cap 624, rear cover 626, and ethernet cable 620 ready to be mated with shielded jack body 622. Ethernet cable 620 is prepared so that conductors 628 are exposed. Rear cover 626 is slipped over ethernet cable 620 and then termination cap 624 is placed on the end of ethernet cable 620 so that conductors 628 pass through conductor channels 630. Conductors 628 are held in place via retention tabs 632. Termination cap 624 with ethernet cable 620 and conductors 628 are then mated to the back of shielded jack body 622, terminating conductors 628 with jack contacts 638. Rear cover 626 is then slid forward toward shielded jack body 622. Cap strain relief toggles 634 and jack strain relief toggle 636 are then pushed inward to grip ethernet cable 620 to provide strain relief. Cover retention snap 639 will engage cover retention slot 640, locking rear cover 626 to the rear of single pair ethernet jack 614 and holding cap strain relief toggles 634 and jack strain relief toggle 636 engaged with ethernet cable 620.

Figure 36:
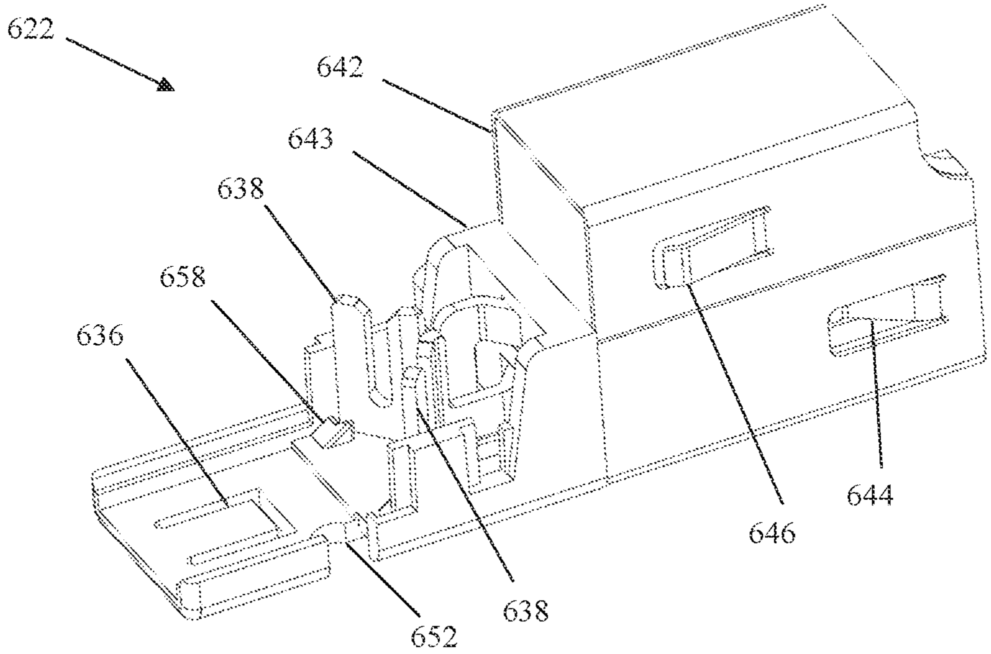
FIG. 36 is an isometric view of the shielded jack body of FIG. 33.

FIG. 36 is an isometric view of shielded jack body 622 comprised of jack shield 642, jack housing 643, and jack contacts 638. Plug grounding tabs 644 contact the body of single pair ethernet plug 618. Jack grounding tabs 646 contact Mini-Com adapter 616.

Figure 37:
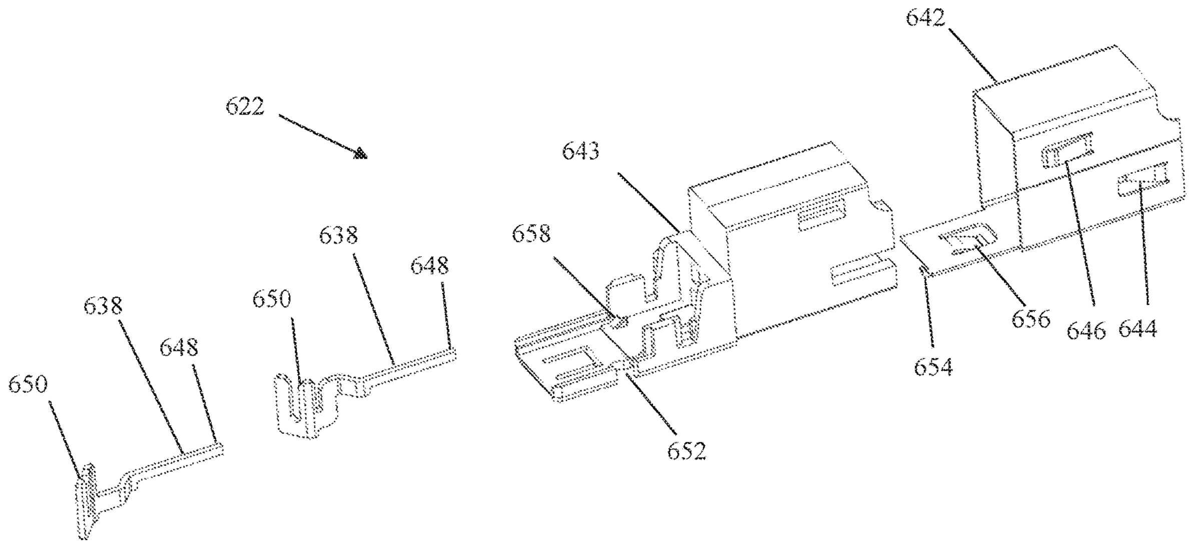
FIG. 37 is an exploded isometric view of the shielded jack body of FIG. 33.

FIG. 37 is an exploded isometric view of shielded jack body 622 comprised of jack shield 642, jack housing 643, and jack contacts 638. Jack contacts 638 are inserted into jack housing 643 and held in place with contact retention ramps 658. Plug interface end 648 of jack contact 638 will touch contacts inside single pair ethernet plug 618. Insulation displacing end 650 of jack contact 638 will terminate with conductors 628 inside ethernet cable 620. The shield braid of ethernet cable 620 passes through braid slot 652 in jack housing 643 and contact jack shield 642 at braid tab 654. When mated with shielded jack body 622, rear cover 626 touches cover contact 656 on jack shield 642.

Figure 38:
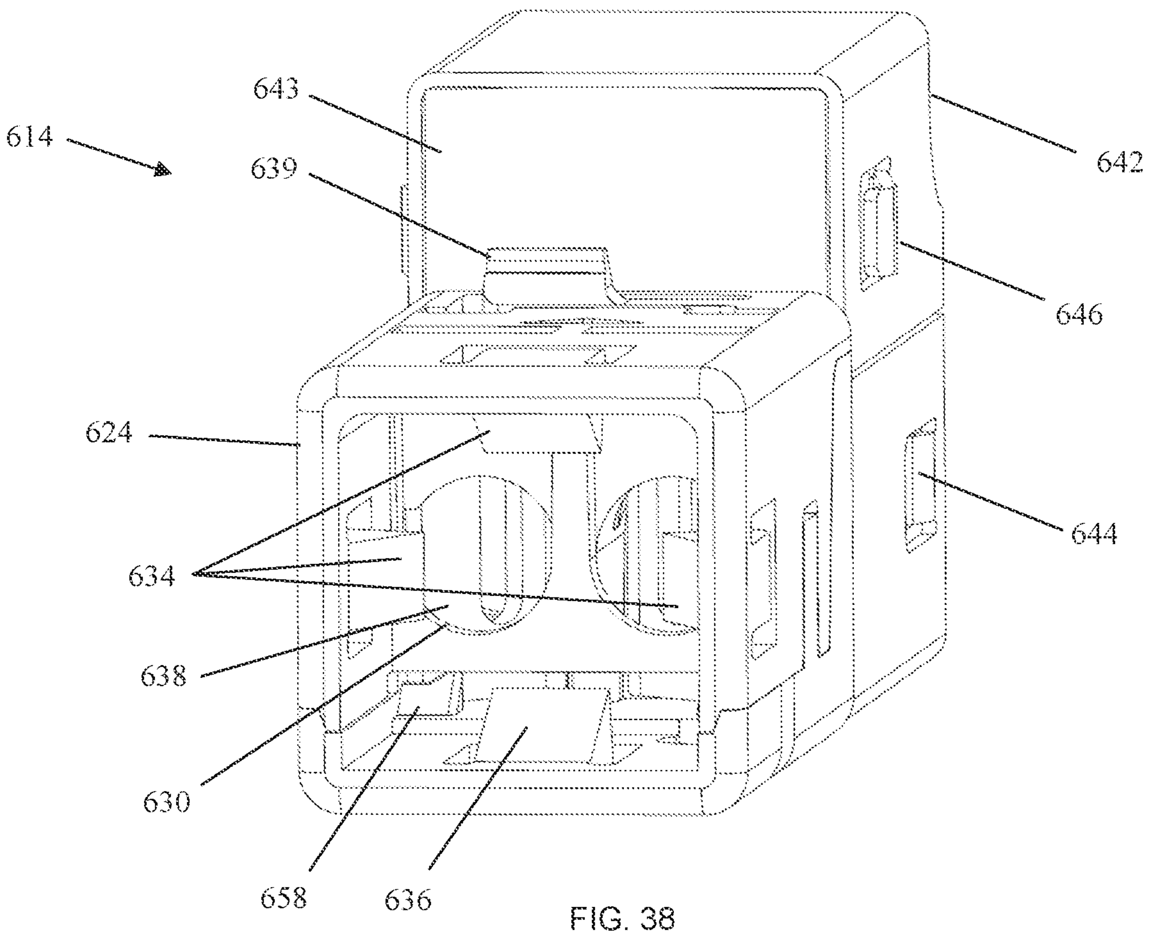
FIG. 38 is a front isometric view of the SPE jack of FIG. 33.

FIG. 38 shows a rear isometric view of single pair ethernet jack 614 in a terminated condition but with rear cover 626 and ethernet cable 620 removed so that the inside can be viewed clearly. Cap strain relief toggles 634 and jack strain relief toggle 636 are illustrated in the closed position due to rear cover 626 pushing them inward. Cap strain relief toggles 634 and jack strain relief toggle 636 would grip ethernet cable 620 providing strain relief against tensile forces.

While particular embodiments and applications of the present invention have been illustrated and described, it is to be understood that the invention is not limited to the precise construction and compositions disclosed herein and that various modifications, changes, and variations may be apparent from the foregoing without departing from the spirit and scope of the invention as described.

The invention claimed is:

1. A communications connector comprising:

a shielded jack body wherein the shielded jack body has a single pair of plug interface contacts having a first thickness and a single pair of insulation displacement contacts (IDCs) having a second smaller thickness, the plug interface contacts configured to electrically connect to the insulation displacement contacts; and a wire cap, wherein the wire cap is configured to terminate a pair of conductors to the pair of insulation displacement contacts by being secured to the shielded jack body in a direction perpendicular to a direction of an insertion of an associated connector and wherein the IDCs are orientated at an angle between being parallel and being perpendicular relative to the axes of the conductors.

2. The communications connector of claim 1 wherein the wire cap further comprises conductor passages configured to retain and align the pair of conductors in a direction parallel to a direction of mating insertion.

* * * * *